US011704185B2

(12) United States Patent
Lavi et al.

(10) Patent No.: US 11,704,185 B2
(45) Date of Patent: Jul. 18, 2023

(54) MACHINE LEARNING-BASED TECHNIQUES FOR PROVIDING FOCUS TO PROBLEMATIC COMPUTE RESOURCES REPRESENTED VIA A DEPENDENCY GRAPH

(71) Applicant: Microsoft Technology Licensing, LLC, Redmond, WA (US)

(72) Inventors: Yaniv Lavi, Tel Aviv (IL); Rachel Lemberg, Herzliya (IL); Raphael Fettaya, Tel Aviv (IL); Dor Bank, Tel Aviv (IL); Ofri Kleinfeld, Tel Aviv (IL); Linoy Liat Barel, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/019,953

(22) Filed: Sep. 14, 2020

(65) Prior Publication Data

US 2022/0019495 A1    Jan. 20, 2022

Related U.S. Application Data

(60) Provisional application No. 63/051,640, filed on Jul. 14, 2020.

(51) Int. Cl.
*G06F 11/07* (2006.01)
*G06N 20/00* (2019.01)

(52) U.S. Cl.
CPC .......... *G06F 11/079* (2013.01); *G06F 11/076* (2013.01); *G06F 11/0757* (2013.01); *G06F 11/0778* (2013.01); *G06N 20/00* (2019.01)

(58) Field of Classification Search
CPC .. G06F 11/079; G06F 11/0757; G06F 11/076; G06F 11/0778; G06F 11/0754;
(Continued)

(56) References Cited

U.S. PATENT DOCUMENTS 7,426,497 B2 * 9/2008 Bacioiu ................ G06F 18/217
706/20
9,659,056 B1 * 5/2017 Chechik .............. G06F 16/2462
(Continued)

OTHER PUBLICATIONS

"International Search Report and Written Opinion Issued in PCT Application No. PCT/US21/029254", dated Aug. 5, 2021, 15 Pages.
(Continued)

*Primary Examiner* — Loan L.T. Truong
*Assistant Examiner* — Matthew N Putaraksa
(74) *Attorney, Agent, or Firm* — Newport IP, LLC; Jacob P. Rohwer

(57) ABSTRACT

Methods, systems, apparatuses, and computer-readable storage mediums are described for machine learning-based techniques for reducing the visual complexity of a dependency graph that is representative of an application or service. For example, the dependency graph is generated that comprises a plurality of nodes and edges. Each node represents a compute resource (e.g., a microservice) of the application or service. Each edge represents a dependency between nodes coupled thereto. A machine learning-based classification model analyzes each of the nodes to determine a likelihood that each of the nodes is a problematic compute resource. For instance, the classification model may output a score indicative of the likelihood that a particular compute resource is problematic. The nodes and/or edges having a score that exceed a predetermined threshold are provided focus via the dependency graph.

18 Claims, 13 Drawing Sheets

(58) Field of Classification Search
CPC .............. G06F 11/3409; G06F 11/323; G06F 11/3636; G06F 11/302; G06F 2201/865; G06N 20/00; G06N 20/20; G06N 5/003; G06N 5/022; G06N 5/01
See application file for complete search history.

(56) References Cited

U.S. PATENT DOCUMENTS

| | | | |
|---|---|---|---|
| 10,303,586 B1* | 5/2019 | Falko | G06F 11/368 |
| 10,642,719 B1 | 5/2020 | Balasubramanian et al. | |
| 11,171,975 B2* | 11/2021 | Vasseur | H04L 45/22 |
| 2008/0065928 A1* | 3/2008 | Suzuki | G06F 11/079 715/781 |
| 2016/0217022 A1 | 7/2016 | Surana et al. | |
| 2017/0068581 A1* | 3/2017 | Qi | G06F 11/0709 |
| 2017/0076202 A1* | 3/2017 | George | G06N 5/045 |
| 2018/0210929 A1* | 7/2018 | Mukherjee | G06F 16/248 |
| 2018/0234442 A1* | 8/2018 | Luo | H04L 63/14 |
| 2019/0114244 A1 | 4/2019 | Salunke et al. | |
| 2019/0147350 A1* | 5/2019 | Bai | G06Q 10/067 706/25 |
| 2019/0383705 A1* | 12/2019 | Smart | G01H 1/00 |
| 2020/0034222 A1* | 1/2020 | Bendiganavale | G06F 11/079 |
| 2020/0042700 A1* | 2/2020 | Li | G06F 21/554 |
| 2020/0057956 A1* | 2/2020 | Phan | G06N 20/00 |
| 2020/0065691 A1* | 2/2020 | Lovett | G06N 5/048 |
| 2020/0210538 A1* | 7/2020 | Wang | G06F 30/20 |
| 2020/0226049 A1* | 7/2020 | Cowan | G06F 11/3604 |
| 2020/0228550 A1* | 7/2020 | Ravindranathan | H04L 43/16 |
| 2020/0250477 A1* | 8/2020 | Barthur | G06F 9/542 |
| 2020/0265136 A1* | 8/2020 | Van Rensburg | G06F 21/577 |
| 2021/0089928 A1* | 3/2021 | Ueki | G06Q 10/04 |
| 2021/0097432 A1* | 4/2021 | Olgiati | G06N 20/00 |
| 2021/0133612 A1* | 5/2021 | Sinha | G06N 7/005 |
| 2021/0224685 A1* | 7/2021 | Mitra | G06N 7/005 |
| 2021/0241167 A1* | 8/2021 | Li | G06N 20/00 |
| 2021/0318675 A1* | 10/2021 | Koziolek | G05B 19/4183 |
| 2021/0365453 A1* | 11/2021 | Forsyth | G06N 20/00 |
| 2022/0044133 A1* | 2/2022 | Otto | G06K 9/6257 |

OTHER PUBLICATIONS

Zhou, et al., "Latent error prediction and fault localization for microservice applications by learning from system trace logs", In Proceedings of the 27th ACM Joint Meeting on European Software Engineering Conference and Symposium on the Foundations of Software Engineering, Aug. 26, 2019, pp. 683-694.

* cited by examiner

US 11,704,185 B2

MACHINE LEARNING-BASED TECHNIQUES FOR PROVIDING FOCUS TO PROBLEMATIC COMPUTE RESOURCES REPRESENTED VIA A DEPENDENCY GRAPH

CROSS-REFERENCE TO RELATED APPLICATION(S)

The present application claims priority to U.S. Provisional Patent Application No. 63/051,640, entitled "MACHINE LEARNING-BASED TECHNIQUES FOR PROVIDING FOCUS TO PROBLEMATIC COMPUTE RESOURCES REPRESENTED VIA A DEPENDENCY GRAPH," and filed on Jul. 14, 2020, the entirety of which is incorporated by reference herein.

BACKGROUND

Microservices are processes that communicate with each other over a network, each providing respective capabilities to the microservices network that are relatively confined in scope. The use of microservices has been trending upwards and is being adopted by many large-scale distributed systems. The proliferation of microservices-based applications generates new problems. A typical traditional monolithic application consists of a single process. It is easy to attach a debugger to this process to have a complete view of the runtime state of the application. In contrast, a microservices-based application can be composed of hundreds of processes. Thus, debugging and finding the root cause of the application becomes very difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for machine learning-based techniques for reducing the visual complexity of a dependency graph that is representative of an application or service. For example, the dependency graph is generated that comprises a plurality of nodes and edges. Each node represents a compute resource (e.g., a microservice) of the application or service. Each edge represents a dependency between nodes coupled thereto. A machine learning-based classification model analyzes each of the nodes to determine a likelihood that each of the nodes is a problematic compute resource. For instance, the classification model may output a score indicative of the likelihood that a particular compute resource is problematic. The nodes and/or edges having a score that exceed a predetermined threshold are provided focus via the dependency graph.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
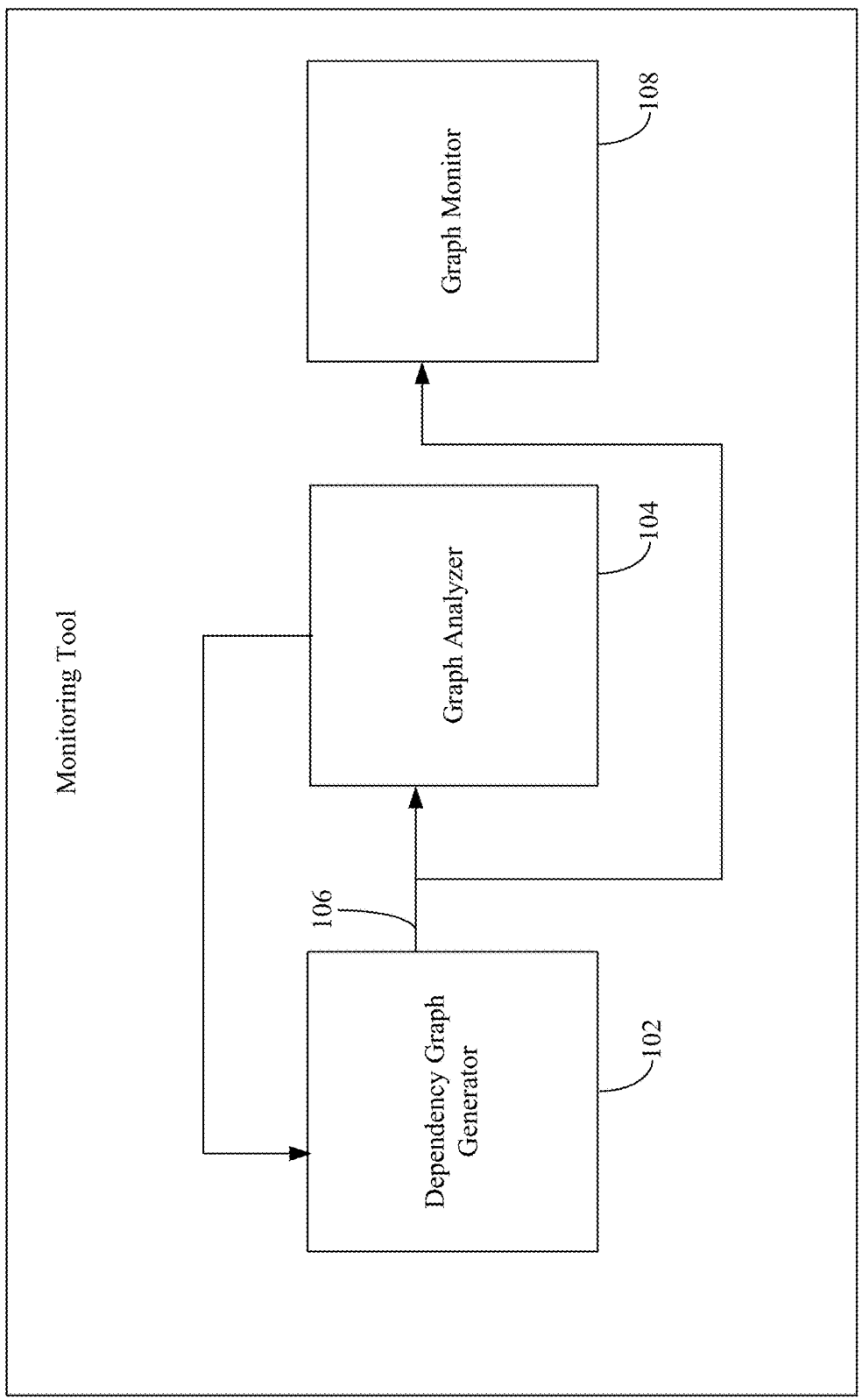
FIG. 1 shows a block diagram of a monitoring tool for providing focus to problematic components of an application in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Monitoring and mitigating application issues typically consists of custom-built dashboards to view problem areas and traversing time series data to locate issues. Certain methods include using maps of interacting components to visualize application structure and to assist with locating problems associated with those components. Large customers with large, complex applications (e.g., that use a microservice architecture) produce exceptionally large maps that have visual complexity and reduce the usefulness to mitigate application issues fast.

The problem of locating problems/issues in a live service that consists of many components interacting with each other is a prominent issue in live service monitoring. Many solutions show the connections in some graphical form and provide a user with information that can help the user diagnose the issue. Furthermore, some of those solutions highlight certain aspects such as failures on certain dependencies or nodes that are graphically represented, which assist the user to investigate and direct the user in the right direction of the issue.

Conventionally, the decision to highlight/recommend for diagnosis is binary and is a result of static analysis of certain parameters associated with a component (e.g., if a number of times the component has failed, then the component is highlighted). In large maps this can further increase visual complexity, with a large number of components being highlighted, thereby making debugging difficult.

Embodiments described herein are directed to machine learning-based techniques for reducing the visual complexity of a dependency graph that is representative of an application or service. For example, the dependency graph is generated that comprises a plurality of nodes and edges. Each node represents a compute resource (e.g., a microservice) of the application or service. Each edge represents a dependency between nodes coupled thereto. A machine learning-based classification model analyzes each of the nodes to determine a likelihood that each of the nodes is a problematic compute resource. For instance, the classification model may output a score indicative of the likelihood that a particular compute resource is problematic. The nodes and/or edges having a score that exceed a predetermined threshold are provided focus via the dependency graph.

The foregoing techniques advantageously reduce the number of nodes and/or edges to which focus is provided. Accordingly, users debugging applications or services comprising hundreds or even thousands of compute resources are focused to a relatively low number of nodes and/or edges that are representative of the most problematic compute resources. In contrast, conventional techniques use a static decision for providing focus, which result in too many nodes and/or edges to be focused. This confuses the user and makes investigating issues with the application or service difficult.

In addition, the techniques described herein improve the functioning of a computing device. For instance, by reducing the number of nodes and/or edges that are provided focus, a user is more quickly able to locate and debug problematic resources. Accordingly, such techniques reduce the level of user interaction with the dependency graph. As such, a lesser amount of compute resources (e.g., input/output (I/O) operations, processor cycles, power, memory, etc.) are utilized when performing such operations. Moreover, the reduction in debug time allows the user to root cause a problem much quicker, and thus, drastically reduces the downtime of application or service represented by the dependency graph.

A. Techniques for Identifying Problematic Compute Resources Via a Dependency Graph For instance, FIG. 1 shows a block diagram of a monitoring tool 100 for providing focus to problematic components of an application in accordance with an example embodiment. Monitoring tool 100 is configured to monitor a plurality of compute resources that are utilized to execute one or more applications or services. An example of monitoring tool 100 includes, but is not limited to, Azure® Monitor published by Microsoft Corporation of Redmond, Wash. Monitoring tool 100 is configured to collect and analyze telemetry from such compute resources, which may be located in a cloud-based environment and/or on-premises environments. Monitoring tool 100 may assist a user to detect and diagnose issues across applications and dependencies. For instance, monitoring tool 100 may assist the user to analyze the data that is monitored for troubleshooting and deep diagnostics. Monitoring tool 100 may provide a dashboard to the user, which enables the user to perform the foregoing tasks. For instance, the dashboard may present a dependency graph (or map) to the user that graphically displays various compute resources utilized to execute application(s) or service(s) and the dependencies therebetween.

For instance, as shown in FIG. 1, system 100 includes a dependency graph generator 102, a graph analyzer 104, and a graph monitor 108. Dependency graph generator 102 is configured to analyze various components of application(s) or service(s) and generate a dependency graph 106 representative thereof. The components may comprise one or more compute resources. Examples of compute resources include, but are not limited to, microservices, services, virtual machines, etc. Microservices are small, independently versioned and scalable, modular customer-focused services (computer programs/applications) that communicate with each other over standard protocols (e.g., HTTP, SOAP, etc.) with well-defined interfaces (e.g., application programming interfaces (APIs)). Each microservice may implement a set of focused and distinct features or functions. Microservices may be written in any programming language and may use any framework.

Dependency graph 106 may comprise a plurality of nodes and edges that couple various nodes of the plurality of nodes. Each node of dependency graph 106 is representative of a particular compute resource of the application(s) or service(s) represented by dependency graph 106. An edge coupling two nodes represents a dependency between the compute resources represented by the nodes. For instance, an edge may represent a transaction between two compute resources. Examples of transactions include, but are not limited to, a function call, a remote procedure call, an application programming interface (API) call, or a request or any instruction that instructs another compute resource to perform an operation. For instance, the transaction may be configured to retrieve data or a file from another compute resource (e.g., a file system service), retrieve a row of user data from another compute resource (e.g., database service), instruct that a computation to be performed by another compute resource, etc.

Dependency graph generator 102 may analyze log data and/or metrics generated by application(s) or service(s) during execution to generate dependency graph 106. Log data comprises data that describes an event that has occurred with respect to a particular resource. The log data comprises details about the event, such as a compute resource that was accessed, the entity that accessed it, and the time at which it was accessed. Metrics comprise data (e.g., numerical values) that provide information about a particular compute resource-related process or activity that is measured over intervals of time. Metrics may measure how busy a compute resource is (e.g., a request rate), measure whether any errors occurred with respect to a compute resource (e.g., an error rate), measure the latency of a compute resource (e.g., the duration of requests issued by and/or received by a compute resource), etc. Such metrics may be collected at regular intervals (e.g., each second, each minute, each hour, each day, etc.) and may be aggregated as a time series (i.e., a series of data points indexed in time order).

Dependency graph generator 102 is configured to identify each compute resource identified via the log data and/or metrics and generate a node representative thereof. Dependency graph generator 102 is further configured to identify dependencies between compute resources identified via the log data and/or metrics and generate an edge that couples the nodes corresponding to the compute resources.

Graph analyzer 104 is configured to analyze dependency graph 106 to determine problematic compute resources. As will be described below, graph analyzer 104 utilizes machine learning-based techniques to determine which compute resources represented by dependency graph 106 are problematic. The determined compute resources are identified and provided to dependency graph generator 102. Dependency graph generator 102 provides focus to the problematic compute resources via dependency graph 106. For instance, dependency graph generator 102 may update dependency graph 106 to include a visual indicator that provides focus to the problematic compute resources. For example, dependency graph generator 102 may highlight the nodes corresponding to the problematic compute resources and/or the edges representative of dependencies between problematic compute resources. In another example, dependency graph generator 102 may enlarge the nodes corresponding to the compute resources and/or the edges representative of dependencies between problematic compute resources. It is noted that the examples provided above for providing focus to problematic compute resources are purely exemplary and that other techniques may be utilized to provide focus to problematic compute resources.

Monitoring tool 100 enables a user to interact with dependency graph 106 via graph monitor 108, for example, during a debug session, to debug issues with the application(s) or service(s) represented by dependency graph 106. Graph monitor 108 may comprise a user interface (e.g., a graphical user interface) that is configured to render dependency graph 106 and detect user input with respect to dependency graph 106. For instance, a user may provide user input (e.g., via an input device, such as a mouse, keyboard, stylus, touch screen, etc.) to select any of the nodes and/or edges displayed via dependency graph 106. Responsive to selecting a node and/or edge, monitoring tool 100 may display additional information associated with that node and/or edge. The additional information may include data included in the associated log data and/or metrics. Such information provides context to the user in order to root cause the issue(s) with the application(s) or service(s) represented by dependency graph 106.

Figure 2:
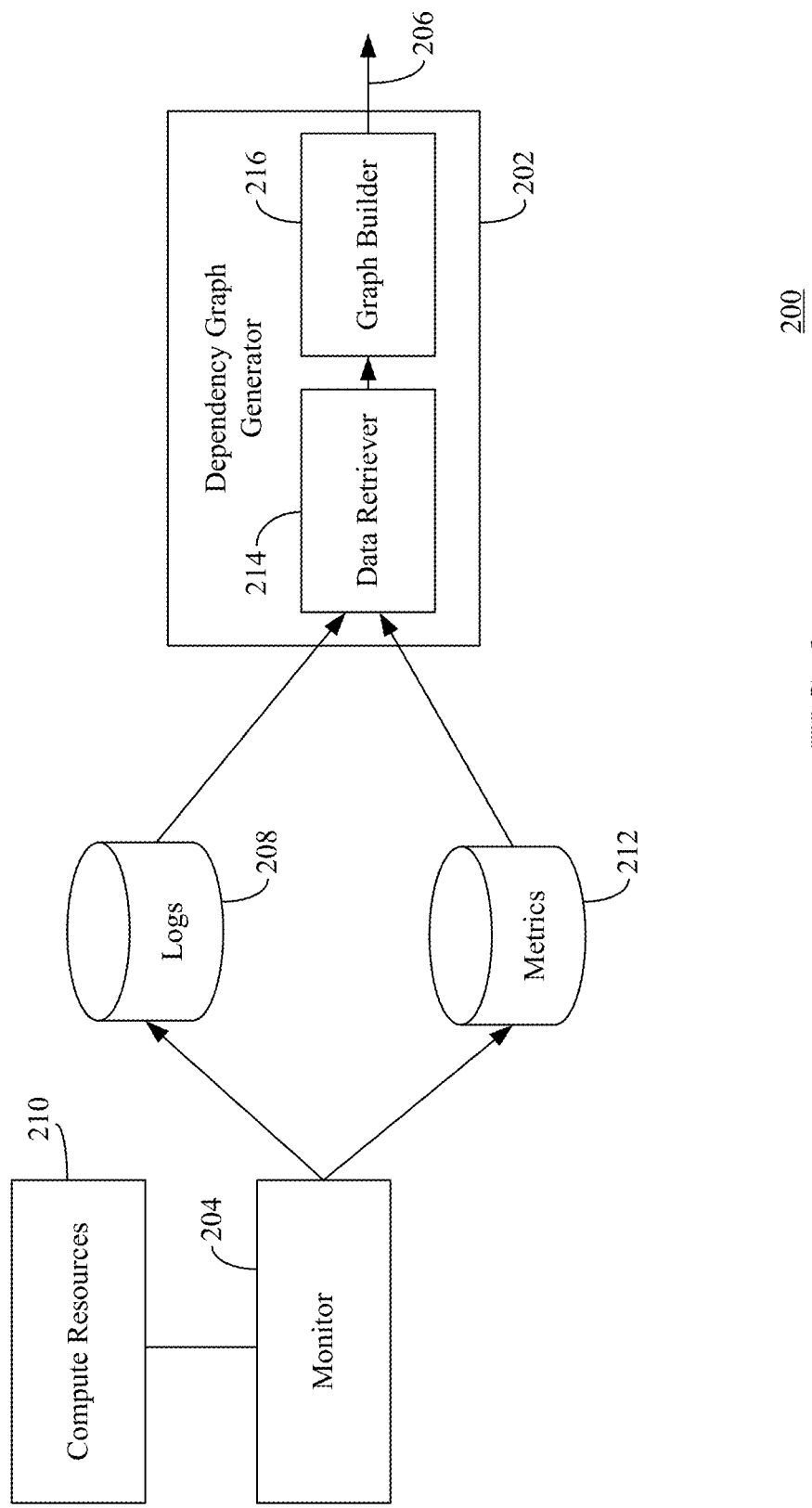
FIG. 2 is a block diagram of a system for generating a dependency graph in accordance with an example embodiment.

FIG. 2 is a block diagram of a system 200 for generating a dependency graph in accordance with an example embodiment. As shown in FIG. 2, system 200 comprises dependency graph generator 202, a monitor 204, compute resources 210, a first data storage 208, and a second data storage 212. Dependency graph generator 202 is an example of dependency graph generator 102, as described above with reference to FIG. 1. Monitor 204 may be incorporated as part of monitoring tool 100, as described above with reference to FIG. 1. However, the embodiments described herein are not so limited.

Monitor 204 is configured to monitor compute resources 210 and generate log data and metrics associated with each of compute resources 210. Examples of compute resources 210 include, but are not limited to, microservices, services, virtual machines, etc. As described above with reference to FIG. 1, log data comprises data that describes an event that has occurred with respect to a particular compute resource of compute resources 210. The log data comprises details about the event, such as a compute resource that was accessed, the entity that accessed it, and the time at which it was accessed. Metrics comprise data (e.g., numerical values) that provide information about a particular compute resource-related process or activity that is measured over intervals of time. For example, metrics may measure how busy a compute resource is (e.g., a request rate), measure whether any errors occurred with respect to a compute resource (e.g., an error rate), measure the latency of a compute resource (e.g., the duration of requests issued by and/or received by a compute resource), etc. Such metrics may be collected at regular intervals (e.g., each second, each minute, each hour, each day, etc.) and may be aggregated as a time series, Monitor 204 stores log data in first data storage 208 and stores metrics in second data storage 212. First data storage 208 and second data storage 212 may be any type of physical memory and/or storage device (or portion thereof) that is described herein, and/or as would be understood by a person of skill in the relevant art(s) having the benefit of this disclosure.

Dependency graph generator 202 comprises a data retriever 214 and a graph builder 216. Data retriever 214 is configured to retrieve log data from first data storage 208 and metrics from second log storage 212. Data retriever 214 provides the retrieved log data and metrics to graph builder 216. Graph builder 216 is configured to generate a dependency graph 206 based on the retrieved log data and metrics. For example, graph builder 216 identifies each compute resource of compute resources 210 via the log data and/or metrics and generates a node representative thereof. Graph builder 216 is further configured to identify dependencies between compute resources 210 via the log data and/or metrics and to generate edges representative of such dependencies. Each edge couples nodes corresponding to compute resources 210 having a dependency therebetween. Dependency graph 206 is an example of dependency graph 106, as described above with reference to FIG. 1.

Figure 3:
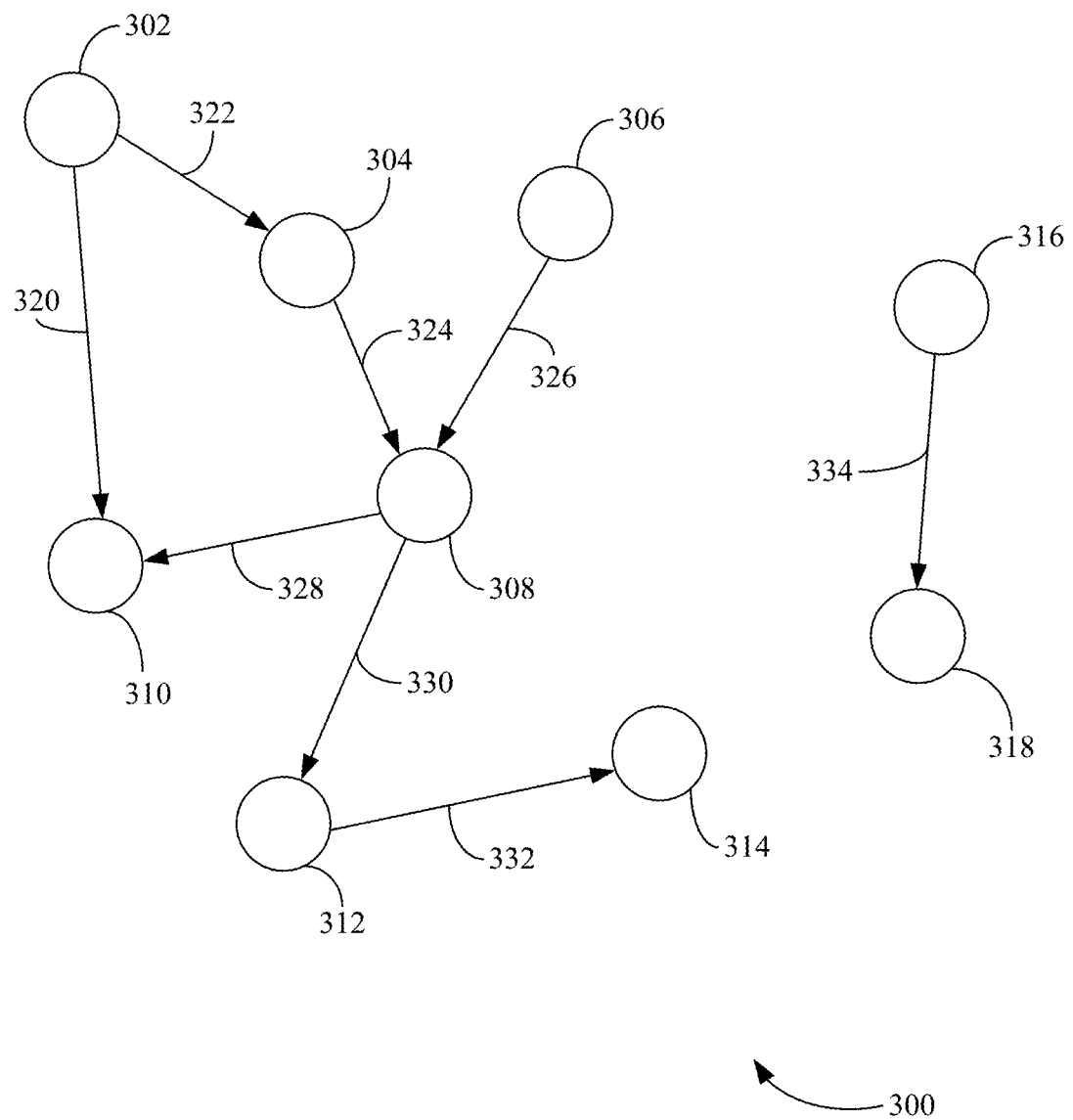
FIG. 3 depicts an example of a dependency graph in accordance with an example embodiment.

FIG. 3 depicts an example of a dependency graph 300 generated by dependency graph generator 202 in accordance with an example embodiment. Dependency graph 300 is an example of dependency graph 206, as described above with reference to FIG. 2. As shown in FIG. 3, dependency graph 300 comprises a plurality of nodes 302, 304, 306, 308, 310, 312, 314, 316, and 318. Node 302 is coupled to node 310 via an edge 320 and coupled to node 304 via an edge 322. Node 304 is coupled to node 308 via an edge 324. Node 306 is coupled to node 308 via an edge 326. Node 308 is coupled to node 310 via an edge 328. Node 308 is coupled to node 312 via an edge 330. Node 312 is coupled to node 314 via an edge 332. Node 316 is coupled to node 318 via an edge 334.

Each of nodes 302, 304, 306, 308, 310, 312, 314, 316, and 318 represents a particular compute resource (e.g., compute resources 210) of the application(s) or service(s) represented by dependency graph 300. Each of edges 320, 322, 324, 326, 328, 330, 332, and 334 represent a dependency between nodes coupled thereto. For instance, each of edges 320, 322, 324, 326, 328, 330, 332, and 334 may represent a transaction between two compute resources represented by the nodes coupled thereto. Examples of transactions include, but are not limited to, a function call, a remote procedure call, an application programming interface (API) call, or a request or any instruction that instructs another compute resource to perform an operation. As shown in FIG. 3, each of edges 320, 322, 324, 326, 328, 330, 332, and 334 is directional to indicate the source and destination of the transaction. For instance, edge 320 points to node 310, which represents that the compute resource represented by node 302 initiated a transaction to the compute resource represented by node 310. It is noted that a compute resource may initiate any number of transactions and/or may be the recipient of any number of transactions, including transactions to itself. Thus, a node may be coupled to a plurality of different edges. It is further noted certain compute resources may represent an application process that is independent from other application processes executed by other compute resources. For instance, nodes 316 and 318 may represent such an independent process. As shown in FIG. 3, nodes 316 and 318 are not coupled to any other node shown in FIG. 3. It is further noted that dependency graph 300 may comprise any number of nodes and edges (e.g., hundreds or thousands) and that the nodes and edges depicted via dependency graph 300 are purely exemplary.

Figure 4:
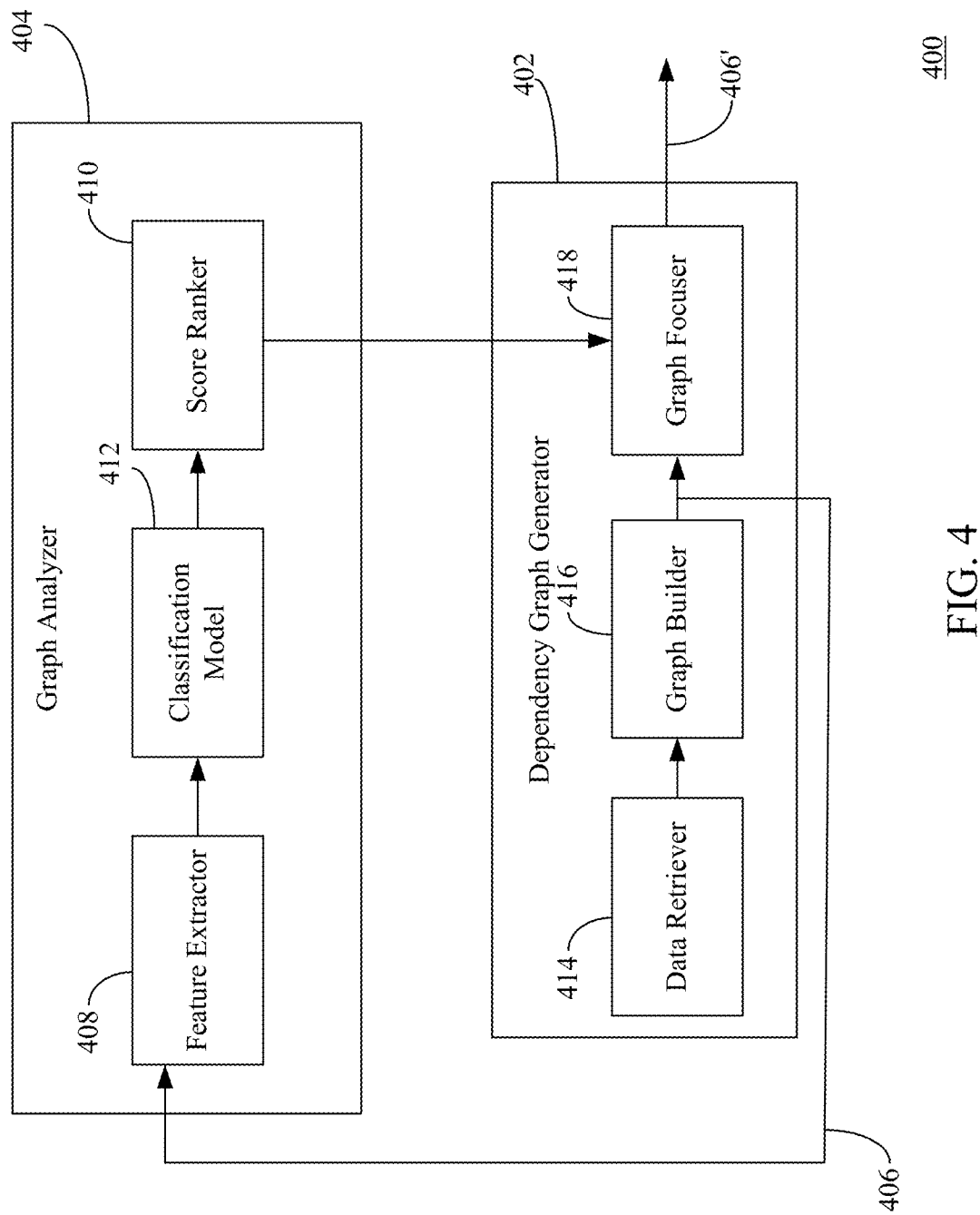
FIG. 4 depicts a block diagram of a system for providing focus to problematic compute resources via a dependency graph in accordance with an example embodiment.

FIG. 4 depicts a block diagram of a system 400 for providing focus to problematic compute resources via a dependency graph in accordance with an example embodiment. As shown in FIG. 4, system 400 comprises a dependency graph generator 402 and a graph analyzer 404. Dependency graph generator 402 and graph analyzer 404 are examples of dependency graph generator 202 and graph analyzer 104, as respectively described above with reference to FIGS. 1 and 2. As shown in FIG. 4, graph analyzer 404 comprises a feature extractor 408, a classification model 412, and a score ranker 410. Dependency graph generator 402 comprises a data retriever 414, a graph builder 416, and a graph focuser 418. Data retriever 414 and graph builder 416 are examples of data retriever 214 and graph builder 216, as described above with reference to FIG. 2.

Feature extractor 408 is configured to receive a dependency graph 406 from graph builder 416. Dependency graph 406 is an example of dependency graph 206 or 300, as respectively described above with reference to FIGS. 2 and 3. Feature extractor 408 extracts features associated with each compute resource represented by a particular node of dependency graph 406. Examples of features include, but are not limited to, features related to the health of compute resource, compute resource-dependency related features with respect to other dependencies, features related to edge types, and features related to the geographical region in which the compute resource is located. Health-related features include a number of transactions (e.g., requests) issued by a particular compute resource, a number of transactions issued by a particular compute resource that failed, type(s) of transaction(s) issued by a particular compute resource, a duration of each transaction issued by a particular compute resource (e.g., an average length of time it takes to complete the transaction), a number of transactions received by a particular compute resource, a number of transactions received by a particular compute resource that failed, type(s) of transaction(s) received by a particular compute resource, a duration of each transaction received by a particular compute resource (e.g., an average length of time it takes to complete the transaction), a failure rate of the requests transmitted to and/or received by a particular resource (e.g., an amount of failures divided by the total number of requests transmitted and/or received), anomalies in the request count (e.g., anomalies in the requests transmitted and/or received in a particular compute resource for a given period of time (e.g., last 3 hours, 6, hours, 24 hours)), anomalies in request duration (e.g., anomalies in the duration of requests transmitted and/or received for a given period of time), anomalies in the failure rate (e.g., anomalies in the failure rate of requests transmitted and/or received for a given time period (e.g., the last 24 hours)), etc. The anomalies may be calculated in accordance with a 3 sigma-rule based anomaly detection technique. However, the embodiments described herein are not so limited. Examples of compute resource-dependency features include, but are not limited to, a compute-resource dependency traffic (e.g., number of requests) ratio with respect to the application or service represented by dependency graph 406 (e.g., the ratio between the traffic of a particular dependency (represented by an edge) and the traffic across the whole application or service represented by dependency graph 406, a compute-resource dependency traffic (e.g., number of requests) ratio with respect to a particular compute resource (e.g., the ratio between the traffic of a particular dependency (represented by an edge) and the entire traffic for the compute resource), a compute-resource dependency request failure ratio with respect to the application or service represented by dependency graph 406 (e.g., the ratio between requests that failed for a particular dependency (represented by an edge) and the number of failed requests across the whole application or service represented by dependency graph 406, a compute-resource dependency request failure ratio with respect to a particular compute resource (e.g., the ratio between requests that failed for a particular dependency (represented by an edge) and the number of failed requests for a particular compute resource. Examples of features related to edge types include, but are not limited to, feature types that appear in more than a predetermined percentage (e.g., 5%) of the training data used to generate classification model 412. Examples of features related to the geographical region in which a compute resource is located include, but are not limited to, an average of the hourly amount of geographical regions from which requests from compute resources located therein were made to a particular dependent compute resource, an average of the hourly amount of geographical regions from which failed requests from compute resources located therein were made to a particular dependent compute resource, anomalies in the amount of geographical regions from which failed requests from compute resources located therein were made to a particular dependent compute resource, etc. The anomalies may be calculated in accordance with a 3 sigma-rule based anomaly detection technique. However, the embodiments described herein are not so limited. Feature extractor 408 provides the features to classification model 412.

Classification model 412 is configured to generate a score for each node of dependency graph 406 based on the extracted features. The score indicates a likelihood that the compute resource represented by the node is problematic. The score may comprise a value between 0.0 and 1.0, where higher the number, the greater the likelihood that the compute resource is problematic. It is noted that the score values described herein are purely exemplary and that other score values may be utilized. As will be described below with reference to FIG. 5, classification model 412 utilizes a machine learning model to generate the score for each node.

Score ranker 410 is configured to compare each score generated for the nodes of dependency graph 406 to a predetermined threshold. If a score for a particular node exceeds the predetermined threshold, then score ranker 410 outputs an indication specifying that the node represents a problematic compute resource. If a score for a particular node does not exceed the threshold, then score ranker 410 determines that the node does not represent a problematic resource and does not output an indication. In accordance with an embodiment, score ranker 410 outputs an indication for nodes having the N highest scores that exceed the threshold, where N is any positive integer. The indications are provided to graph focuser 418 of dependency graph generator 402.

Graph focuser 418 is configured to modify dependency graph 406 such that focus is provided to nodes and/or edges of the nodes of dependency graph 406 that have been identified as representing problematic compute resources based on the indications received from score ranker 410. For example, graph focuser 418 may highlight the nodes, with a particular color, corresponding to the problematic compute resources (as specified by the indications) and/or the edges representative of dependencies between problematic compute resources. In another example, graph focuser 418 may enlarge the nodes corresponding to the compute resources and/or the edges representative of dependencies between problematic compute resources. It is noted that the examples provided above for providing focus to problematic compute resources is purely exemplary and that other techniques may be utilized to provide focus to problematic compute resources. The modified dependency graph (shown as modified dependency graph 406') is rendered via a graphical user interface (GUI) of monitoring tool 100, as described above with reference to FIG. 1.

Figure 5:
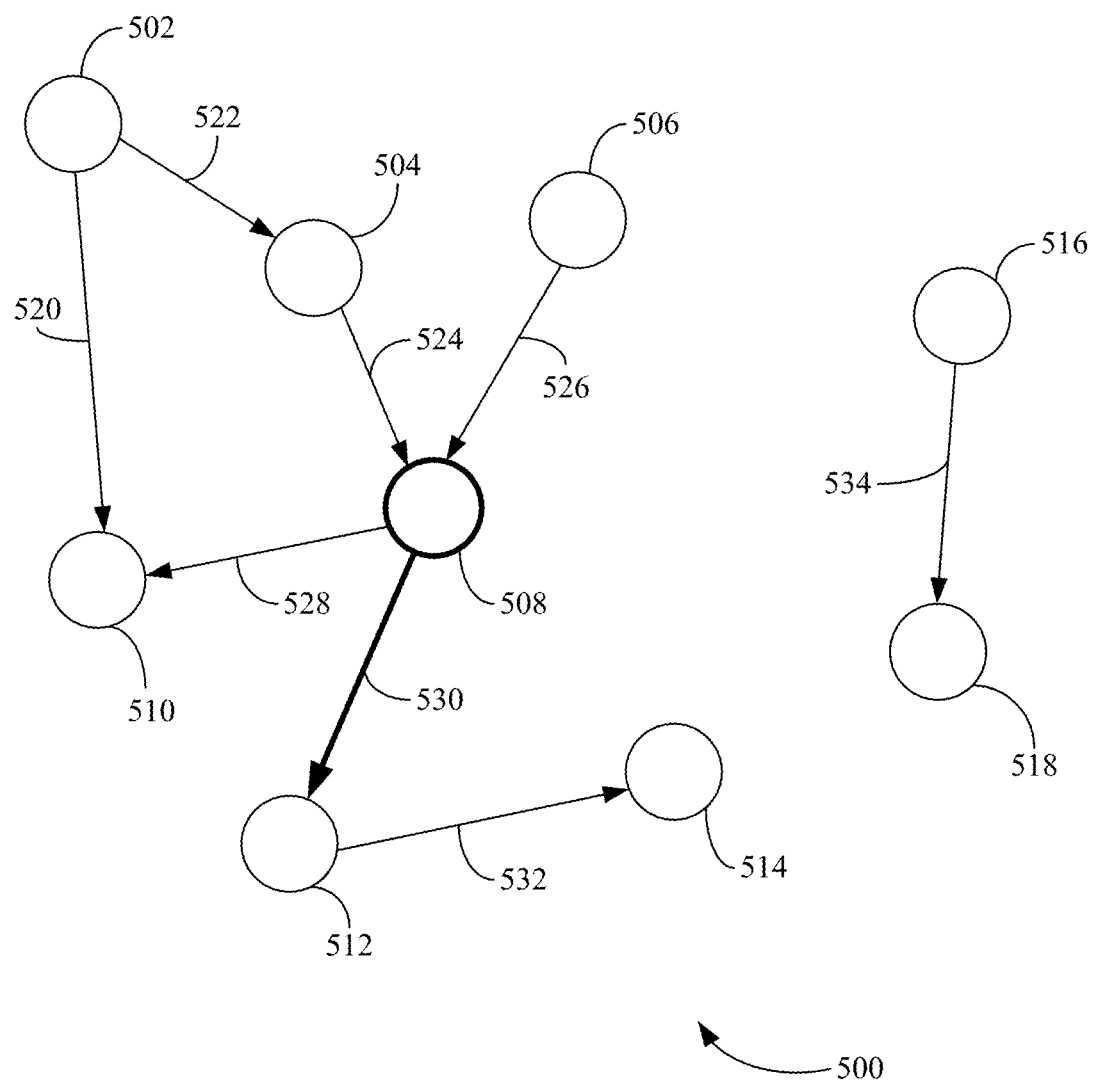
FIG. 5 depicts an example of a dependency graph for which focus has been provided to nodes representing problematic compute resources in accordance with an example embodiment.

FIG. 5 depicts an example of a dependency graph 500 generated by dependency graph generator 402 for which focus has been provided to nodes representing problematic compute resources in accordance with an example embodiment. Dependency graph 500 is an example of dependency graph 300, as described above with reference to FIG. 3. As shown in FIG. 5, node 508 and edge 530 have been highlighted. For example, referring again to FIG. 4, the indications received by graph focuser 418 may have indicated that node 508 represents a problematic compute resource and that edge 530 represents problematic transactions associated with the problematic resource.

Thus, when debugging an application or service represented by dependency graph 500, the user is immediately directed to a very few number of nodes and/or edges that are associated with problematic compute resources rather than being bombarded by an overwhelming number of potentially-problematic nodes and/or edges.

Figure 6:
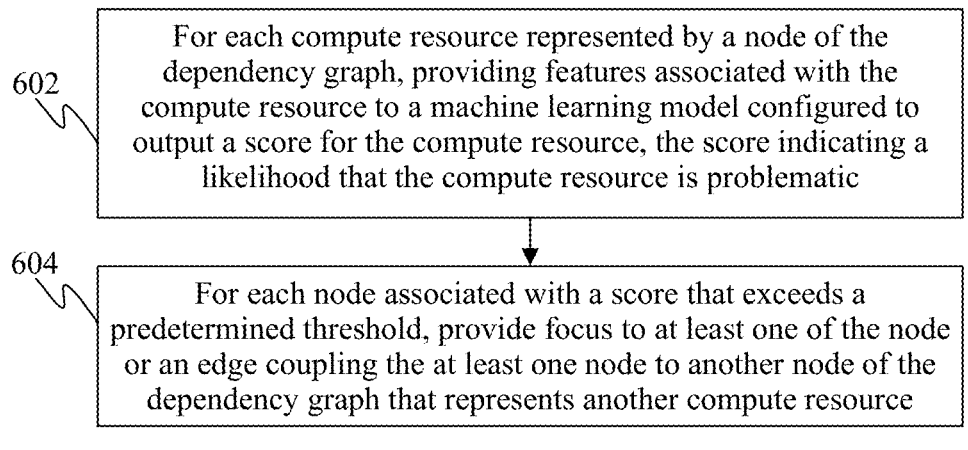
FIG. 6 shows a flowchart of a method for identifying a problematic compute resource via a dependency graph that comprises a plurality of nodes representing a plurality of compute resources in accordance with example embodiment.

Accordingly, problematic compute resources may be identified via a dependency graph in many ways. For example, FIG. 6 shows a flowchart 600 of a method for identifying a problematic compute resource via a dependency graph that comprises a plurality of nodes representing a plurality of compute resources in accordance with example embodiment. In an embodiment, flowchart 600 may be implemented by system 400, as described in FIG. 4. Accordingly, flowchart 600 will be described with continued reference FIG. 4. Other structural and operational embodiments will be apparent to persons skilled in the relevant art(s) based on the following discussion regarding flowchart 600 and system 400.

As shown in FIG. 6, the method of flowchart 600 begins at step 602. At step 602, for each compute resource represented by a node of the dependency graph, features associated with the compute resource is provided to a machine learning model configured to output a score for the compute resource. The score indicates a likelihood that the compute resource is problematic. For example, with reference to FIG. 4, feature extractor 408 extracts features for each node of dependency graph 406 and provides the features to classification model 412. Classification model 412 outputs a score for each node, which represents a particular compute resource. The score indicates a likelihood that the compute resource is problematic.

In accordance with one or more embodiments, the plurality of compute resources comprises at least one of a microservice, a service, or a virtual machine.

In accordance with one or more embodiments, the features associated with the compute resource comprise at least one of a number of first requests issued by the compute resource, a detected anomaly in the number of first requests issued by the compute resources, a number of the first requests that failed, a detected anomaly in the number of first requests that failed, a type of the first requests that failed, a duration for each of the first requests, a detected anomaly in the duration for each of the first requests, a number of second requests received by the compute resource, a detected anomaly in the number of second requests received by the compute resource, a number of the second requests that failed, a detected anomaly in the number of the second requests that failed, a type of the second requests that failed, a duration for each of the second requests, a detected anomaly in the duration for each of the second requests, a ratio of the number of first requests with respect to at least one of other requests issued by the compute resource or requests issued by other compute resources, a ratio of the number second requests with respect to at least one of other requests received by the compute resource or requests received by other compute resources, a ratio of the number of first requests that failed with respect to at least one of other requests issued by the compute resource that failed or other requests issued by other compute resources that failed, a ratio of the number of second requests that failed with respect to at least one of other requests received by the compute resource that failed or other requests received by other compute resources that failed, an average number of geographical regions in which other compute resources that made requests to the compute resource are located, an average number of geographical regions in which other compute resources that made failed requests to the compute resource are located, a detected anomaly in the average number of geographical regions in which other compute resource that made requests to the compute resources are located, or a detected anomaly in the average number of geographical regions in which other compute resources that made failed requests to the compute resource are located.

At step 604, for each node associated with a score that exceeds a predetermined threshold, focus is provided to at least one of the node or an edge coupled to the at least one node and another node of the dependency graph that represents another compute resource. For example, with reference to FIG. 4, score ranker 410 provides an indication to graph focuser 418 for each node having a score that exceeds the predetermined threshold. Graph focuser 418 modifies dependency graph 406 (shown as dependency graph 406') such that focus is provided to at least one of the node or an edge coupled to the at least one node and another node of dependency graph 406.

In accordance with one or more embodiments, providing focus comprises causing the at least one of the node or the edge coupling the node to another node to be highlighted. For example, with reference to FIG. 5, graph focuser 418 has modified dependency graph 500 such that node 508 and edge 530 have been highlighted.

Figure 7:
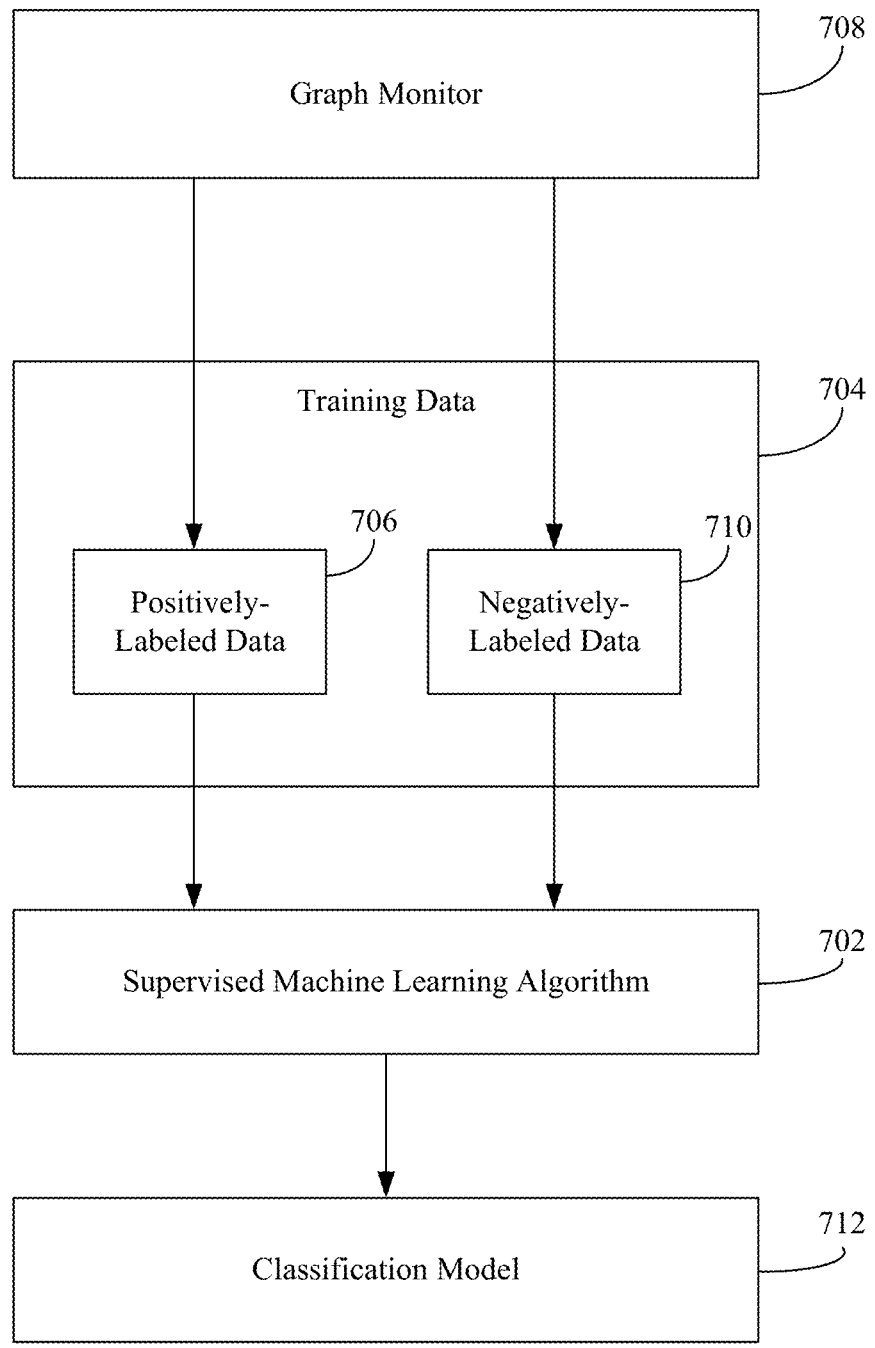
FIG. 7 depicts a block diagram of a system for generating a machine learning model for classifying compute resources in accordance with an example embodiment.

B. Techniques for Generating a Machine Learning Model for Classifying Compute Resources FIG. 7 depicts a block diagram of a system 700 for generating a machine learning model for classifying compute resources in accordance with an example embodiment. As shown in FIG. 7, system 700 comprises a graph monitor 708, a supervised machine learning algorithm 702 and a classification model 712. Graph monitor 708 is an example of graph monitor 108, as described above with reference to FIG. 1. Classification model 712 is an example of classification model 412, as described above with reference to FIG. 4. Graph monitor 708, classification model 712 and supervised machine learning algorithm 702 may be incorporated as part of monitoring tool 100, although the embodiments described herein are not so limited. Supervised machine learning algorithm 702 is configured to receive training data 704. Training data 704 represents data collected from prior debugging sessions (e.g., hundreds or thousands of prior sessions) conducted by a plurality of different users (for example, via monitoring tool 100) via which dependency graphs were interacted with. Training data 704 may comprise first features collected from the prior debugging sessions. The first features are associated with previously-executed compute resources that were previously determined to be problematic. The first features are shown as positively-labeled data 706. Training data 706 may also comprise second features collected from the prior debugging sessions. The second features are associated with previously-executed compute resources that were not previously determined to be problematic. The second features are shown as negatively-labeled data 710.

To determine positively-labeled data 706, graph monitor 708 monitors user input with dependency graphs during prior debugging sessions. Nodes and/or edges that were interacted with (e.g., selected) via user input (e.g., selection of such nodes and/or edges via an input device, such as a mouse, touch screen, keyboard, stylus, etc.) are marked as being potentially problematic, as such nodes and/or edges were investigated to root cause an issue with the application represented by the dependency graph. The features associated with such nodes and/or edges are provided as positively-label data 706.

To determine negatively-labeled data 710, graph monitor 708 may determine nodes and/or edges that were not interacted with by users during prior debugging sessions. Graph monitor 712 determines the features associated with such nodes and/or edges (e.g., or a random selection of such nodes and/or edges) and provides such features as negatively-labeled data 710.

Positively-labeled data 706 is provided as a first input to supervised machine learning algorithm 702, and negatively-labeled data 710 is provided as a second input to supervised machine learning algorithm 702. Using these inputs, supervised machine learning algorithm 702 learns what constitutes a problematic compute resource and generates a classification model 712 that is utilized to generate a score indicative of the likelihood that any given compute resource is problematic or non-problematic.

In accordance with an embodiment, only data from debugging sessions from expert or frequent users is utilized to determine training data 704. For example, graph monitor 708 may monitor the number of times and/or a duration in which a user has engaged with the debugging application (e.g., monitoring tool 100). If the number of times and/or duration of usage for a particular user exceeds a predetermined threshold, then that user is determined to be an expert user, and data associated with the debugging sessions of that user is utilized to determine positively-labeled data 706 and negatively-labeled data 710. The assumption is that if the user frequently engages with debugging application, then the user is an expert user. This advantageously screens out "one-time" visitors that only utilize the debugging application once and/or for a relatively short amount of time without intelligently interacting with the nodes and/or edges of the displayed dependency graph.

In accordance with an embodiment, classification model 712 is in accordance with a random forest classifier, which generates a plurality of decision trees based on the same feature space. The decision trees are randomly merged together to generate a forest of trees. For each decision tree, a score is generated that indicates the likelihood that a particular compute resource is problematic. The scores from each decision tree are aggregated (e.g., averaged) to generate a final score.

In accordance with an embodiment, classification model 712 is validated in accordance with a k-fold cross-validation technique. For example, training data 704 associated with a particular application or service may be divided into a k number of datasets, where k is any positive integer. One of the datasets may be designated as a validation set for validating classification model 712. The remaining k-1 datasets may be designated as the training set for training supervised machine learning algorithm 702. Supervised machine learning algorithm 702 is trained using the training data of the k-1 datasets. To validate classification model 712, classification model 712 generates a classification for each compute resource represented by the validation set. The generated classification is compared to the labeled data of the training data to determine whether mispredictions therebetween. This validation process is repeated a total of k times, where, each time, the validation set comprises a different dataset of the k sets and the training sets comprise the remaining k-1 datasets. The mispredictions are accumulated over the k iterations. The number of correct predictions is also accumulated over the k iterations. The accumulated correct predictions and mispredictions are utilized to determine the effectiveness of classification model 712.

Figure 8:
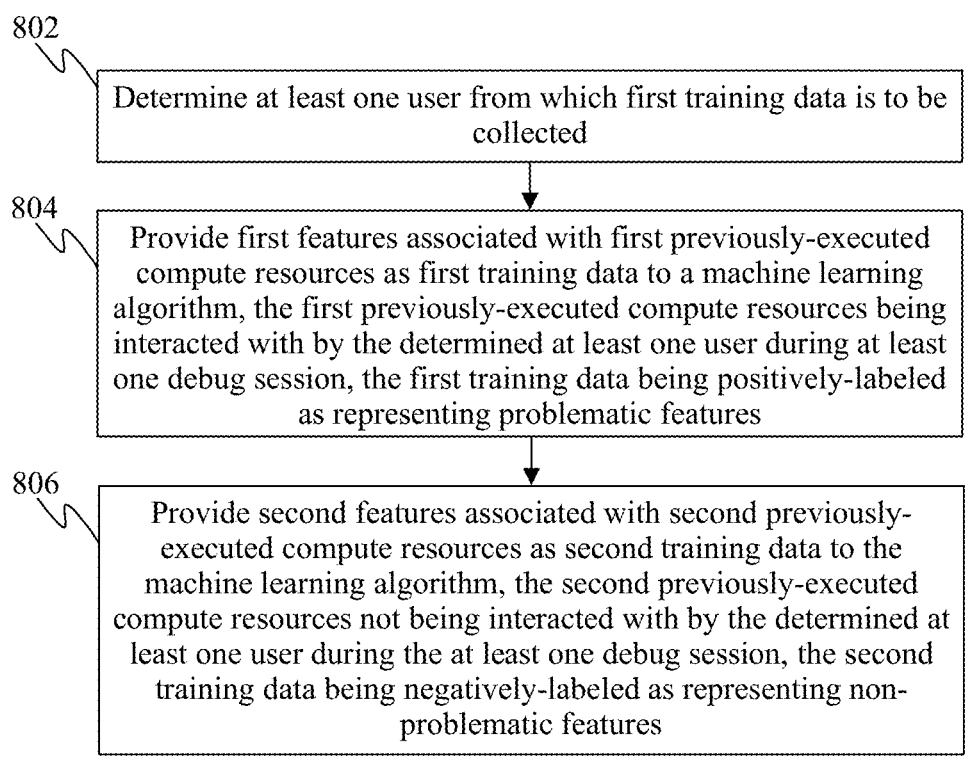
FIG. 8 shows a flowchart of a method for generating a machine learning model for identifying problematic compute resources in accordance with example embodiment.

Accordingly, a machine learning model for identifying problematic compute resources may be generated in many ways. For example, FIG. 8 shows a flowchart 800 of a method for generating a machine learning model for identifying problematic compute resources in accordance with example embodiment. In an embodiment, flowchart 800 may be implemented by system 700, as described in FIG. 7. Accordingly, flowchart 800 will be described with continued reference FIG. 7. Other structural and operational embodiments will be apparent to persons skilled in the relevant art(s) based on the following discussion regarding flowchart 800 and system 700.

As shown in FIG. 8, the method of flowchart 800 begins at step 802. At step 802, at least one user from which first training data is to be collected is determined. For example, with reference to FIG. 7, graph monitor 708 may determine at least one user from which first training data is to be collected.

At step 804, first features associated with first previously-executed compute resources is provided as first training data to a machine learning algorithm, the first previously-executed compute resources being interacted with by the determined at least one user during at least one debug session, the first training data being positively-labeled as representing problematic features. For example, with reference to FIG. 7, graph monitor 708 provides positively-labeled data 706 to supervised machine learning algorithm 702. Positively-labeled data 706 comprises features associated with previously-executed compute resources. Such resources were interacted with by the determined at least one user during at least one debug session, for example, using monitoring tool 100, as described above with reference to FIG. 1.

At step 806, second features associated with second previously-executed compute resources is provided as second training data to the machine learning algorithm, the second previously-executed compute resources not being interacted with by the determined at least one user during the at least one debug session, the second training data being negatively-labeled as representing non-problematic features. The machine learning algorithm generates the machine learning model based on first training data and the second training data. For example, with reference to FIG. 7, graph monitor 708 provides negatively-labeled data 710 to supervised machine learning algorithm 702. Negatively-labeled data 710 comprises features associated with previously-executed compute resources that were not interacted with by the at least one user during the at least one debug session. Machine learning algorithm 702 generates classification model 712 based on positively-labeled data 706 and negatively-labeled data 710.

In accordance with one or more embodiments, the at least one user is determined as follows. For each user of a plurality of users (e.g., of monitoring tool 100), a determination is made that a number of debug sessions in which the user has engaged has exceeded a predetermined threshold. In response to determining that the number of debug sessions in which the at least one user has engaged has exceeded the predetermined threshold, a determination is made that the first training data is to be collected from the user. For example, with reference to FIG. 7, graph monitor 708 may analyze the number of debug sessions conducted by each user of monitoring tool 100, as described above with reference to FIG. 1. If a determination is made that the number of debug sessions exceeds a predetermined threshold, graph monitor 708 collects the user interactions of that user with respect to the nodes and/or edges of the dependency graph that was interacted with during the debug sessions of that user. Graph monitor 708 provides such data to supervised machine learning algorithm 702.

C. Techniques for Providing Additional Information for a Selected Node or Edge

As described above, a user may provide input (e.g., via an input device, such as a mouse, keyboard, stylus, touch screen, etc.) to select any of the nodes and/or edges displayed via a dependency graph. Responsive to selecting a node and/or edge, monitoring tool 100 may display additional information associated with that node and/or edge. The additional information may include data included in the associated log data and/or metrics. For instance, the additional information may comprise features obtained from the log data and/or metrics associated with that node. Such information provides context to the user in order to root cause the issue(s) with the application(s) or service(s) represented by the dependency graph.

In accordance with an embodiment, only the most relevant features are displayed to the user. The most relevant features are the features that impacted the score determined for the selected node the most. The foregoing may be determined by determining a contribution score for each feature utilized to calculate the score for the node.

Figure 9:
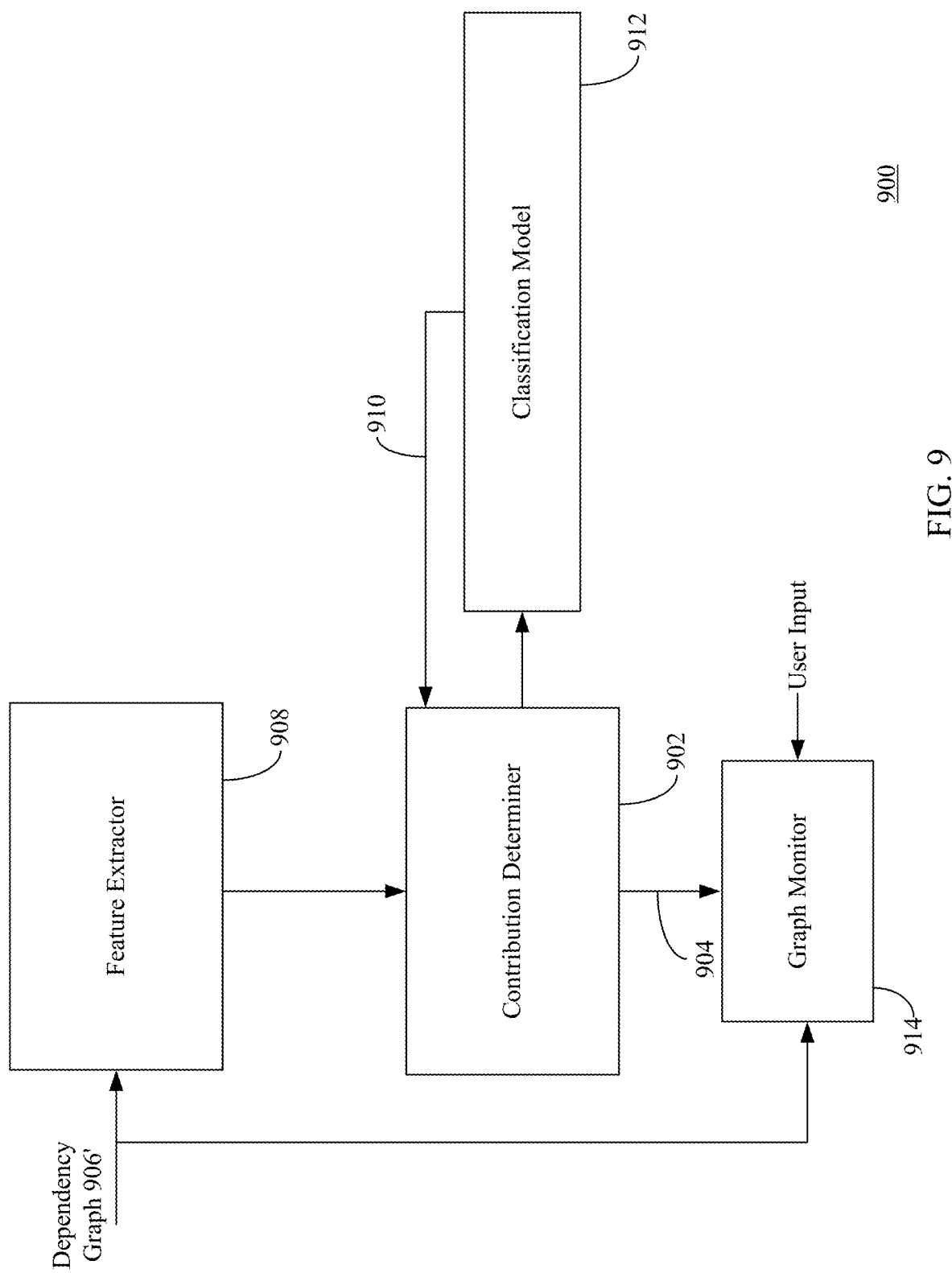
FIG. 9 depicts a block diagram of a system for providing additional information for a selected node or edge in accordance with an example embodiment.

For example, FIG. 9 depicts a block diagram of a system 900 for providing additional information for a selected node or edge in accordance with an example embodiment. As shown in FIG. 9, system 900 comprises a classification model 912, a feature extractor 908, a contribution determiner 902, and a graph monitor 914. Contribution determiner 902 may be incorporated into monitoring tool 100. However, the embodiments described herein are not so limited. Classification model 912 and feature extractor 908 are examples of classification model 412 and feature extractor 408, as described above with reference to FIG. 4. Graph monitor 914 is an example of graph monitor 708, as described above with reference to FIG. 7.

Feature extractor 908 is configured to provide the features determined for compute resources represented by the nodes of dependency graph 906' to contribution determiner 902. Dependency graph 906' is an example of dependency graph 406', as described above with reference to FIG. 4. The features include, but are not limited, features related to the health of compute resource, compute resource-dependency related features with respect to other dependencies, features related to edge types, and features related to the geographical region in which the compute resource is located. Health-related features include a number of transactions (e.g., requests) issued by a particular compute resource, a number of transactions issued by a particular compute resource that failed, a type of transactions issued by a particular compute resource, a duration of each transaction issued by a particular compute resource (e.g., an average length of time it takes to complete the transaction), a number of transactions received by a particular compute resource, a number of transactions received by a particular compute resource that failed, a type of transactions received by a particular compute resource, a duration of each transaction received by a particular compute resource (e.g., an average length of time it takes to complete the transaction), a failure rate of the requests transmitted to and/or received by a particular resource (e.g., an amount of failures divided by the total number of requests transmitted and/or received), anomalies in the request count (e.g., anomalies in the requests transmitted and/or received in a particular compute resource for a given period of time (e.g., last 3 hours, 6, hours, 24 hours)), anomalies in request duration (e.g., anomalies in the duration of requests transmitted and/or received for a given period of time), anomalies in the failure rate (e.g., anomalies in the failure rate of requests transmitted and/or received for a given time period (e.g., the last 24 hours)), etc. The anomalies may be calculated in accordance with a 3 sigma-rule based anomaly detection technique. However, the embodiments described herein are not so limited. Examples of compute resource-dependency features include, but are not limited to, a compute-resource dependency traffic (e.g., number of requests) ratio with respect to the application or service represented by dependency graph 406 (e.g., the ratio between the traffic of a particular dependency (represented by an edge) and the traffic across the whole application or service represented by dependency graph 406), a compute-resource dependency traffic (e.g., number of requests) ratio with respect to a particular compute resource (e.g., the ratio between the traffic of a particular dependency (represented by an edge) and the entire traffic for the compute resource, a compute-resource dependency request failure ratio with respect to the application or service represented by dependency graph 406 (e.g., the ratio between requests that failed for a particular dependency (represented by an edge) and the number of failed requests across the whole application or service represented by dependency graph 406), a compute-resource dependency request failure ratio with respect to a particular compute resource (e.g., the ratio between requests that failed for a particular dependency (represented by an edge) and the number of failed requests for a particular compute resource). Examples of features related to edge types include, but are not limited to, feature types that appear in more than a predetermined percentage (e.g., 5%) of the training data used to generate classification model 412. Examples of features related to the geographical region in which a compute resource is located include, but are not limited to, an average of the hourly amount of geographical regions from which requests from compute resources located therein were made to a particular dependent compute resource, an average of the hourly amount of geographical regions from which failed requests from compute resources located therein were made to a particular dependent compute resource, anomalies in the amount of geographical regions from which failed requests from compute resources located therein were made to a particular dependent compute resource, etc. The anomalies may be calculated in accordance with a 3 sigma-rule based anomaly detection technique.

Contribution determiner 902 determines a contribution score 904 for each of the features. For instance, contribution determiner 902 may determine the relationship between a particular feature input into to classification model 912 and the score (e.g., score 910) outputted thereby for a particular node. For instance, contribution determiner 902 may modify an input feature value and observe the resulting impact on output score 910. If output score 910 is not greatly affected, then contribution determiner 902 determines that the input feature does not impact the output score very much and assigns that input feature a relatively low contribution score (e.g., contribution score 904). If the output score is greatly affected, then contribution determiner 902 determines that the input feature does impact the output score and assigns the input feature a relatively high contribution score. In accordance with an embodiment, contribution determiner 902 utilizes a local interpretable model-agnostic explanation (LIME)-based technique to generate the contribution scores.

Graph monitor 914 is configured to render dependency graph 906' via a display screen and detect user input made with respect to dependency graph 906'. Graph monitor 914 is also configured to receive the contribution scores (e.g., scores 904) determined for each feature of each node of dependency graph 906' and is configured to monitor user input with respect to dependency graph 906'. Responsive to detecting that a user has selected a particular node or edge of dependency graph 906', graph monitor 914 causes the features associated with that node or edge to be displayed to provide additional insight for that node or edge. Graph monitor 914 may display the features based on an order determined based on scores 904. For example, graph monitor 914 may rank scores 904 from highest to lowest and provide a listing of the features based on the ranking, where the features having the highest score are displayed at the top of the list and the features having the lowest score are displayed at the bottom of the list.

In accordance with an embodiment, only the features having a score that exceeds a predetermined threshold are displayed via the listing. This way, the user is presented with a very focused list of features that are related to the root cause of the issue(s) experienced, by the associated compute resource.

Figure 10:
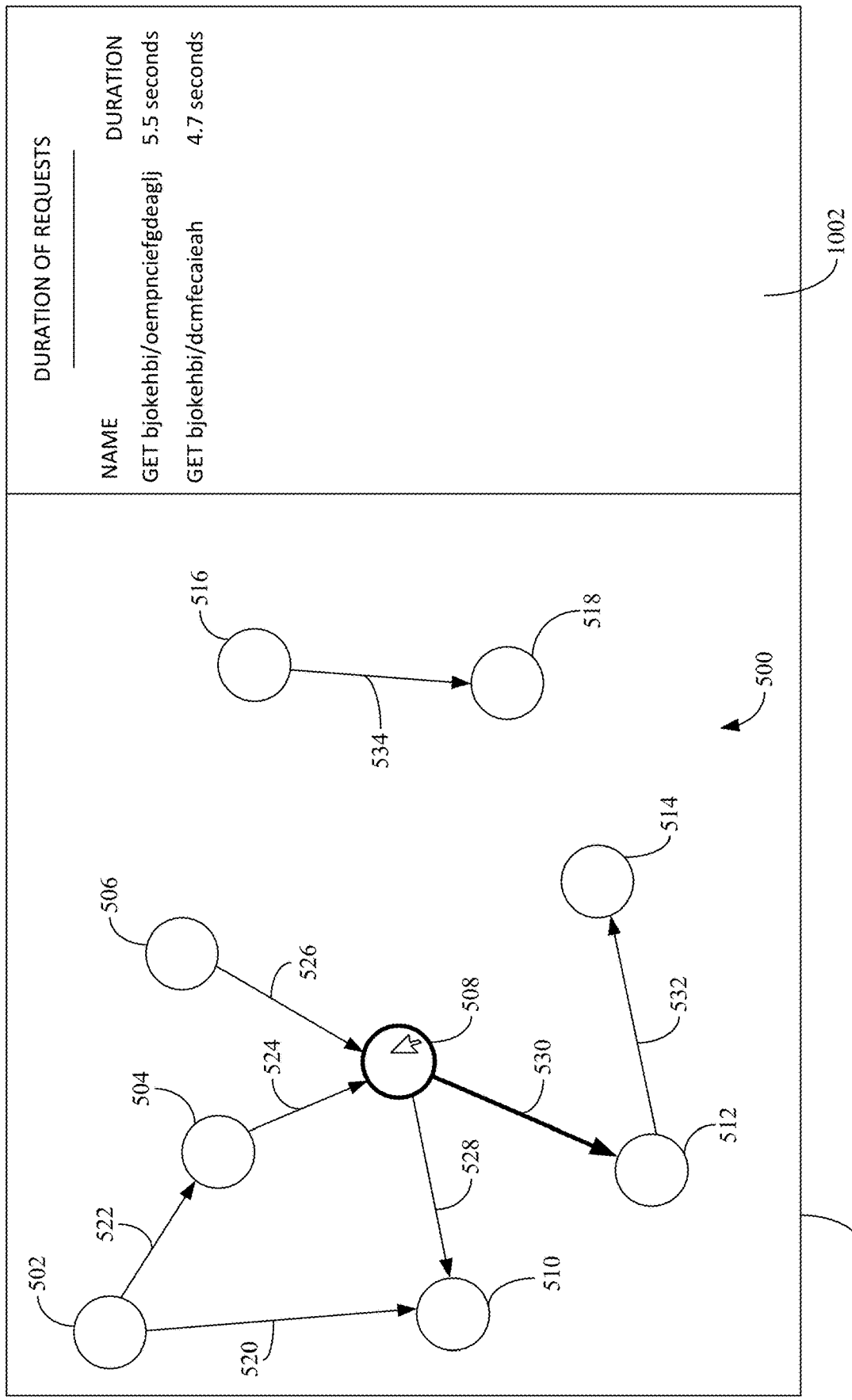
FIG. 10 depicts an example graphical user interface for displaying a dependency graph and additional information for a user-selected node in accordance with an example embodiment.

FIG. 10 depicts an example graphical user interface (GUI) 1000 for displaying a dependency graph and additional information for a user-selected node in accordance with an example embodiment. As shown in FIG. 10, GUI 1000 displays dependency graph 500, as described above with reference to FIG. 5. Accordingly, node 508 and edge 530 have been provided focus (i.e., node 508 and edge 530 are highlighted). As further shown in FIG. 10, a user has selected node 508, for example via mouse input. Responsive to detecting user input, graph monitor 914, as described above with reference to FIG. 9, causes additional information to be displayed via GUI 1000. In the example shown in FIG. 10, a right window pane 1002 is provided that displays the additional information. The additional information comprises features associated with node 508. In particular, only the features having a contribution score that exceed the contribution score (i.e., the features that contributed the most towards the score generated by classification model 912) are displayed. In the example shown in FIG. 10, such features are the duration of requests initiated by the compute resource represented by node 508.

Figure 11:
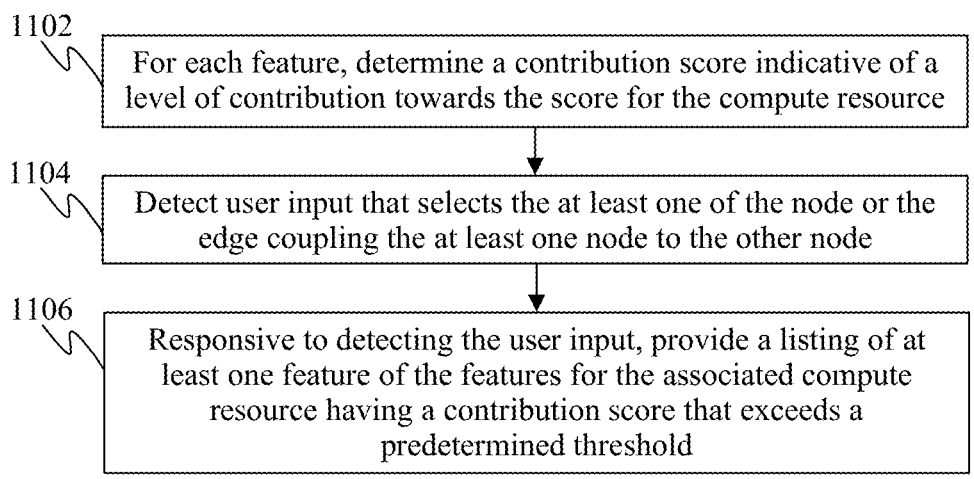
FIG. 11 shows a flowchart of a method for providing additional information for a selected node or edge of a dependency graph in accordance with an example embodiment.

Accordingly, additional information may be provided for a selected node or edge of a dependency graph in accordance with an example embodiment. For example, FIG. 11 shows a flowchart 1100 of a method for providing additional information for a selected node or edge of a dependency graph in accordance with an example embodiment. In an embodiment, flowchart 1100 may be implemented by system 900, as described in FIG. 9. Accordingly, flowchart 1000 will be described with continued reference FIG. 9. Other structural and operational embodiments will be apparent to persons skilled in the relevant art(s) based on the following discussion regarding flowchart 1100 and system 900.

As shown in FIG. 11, the method of flowchart 1100 begins at step 1102. At step 1102, for each feature of the features determined for each compute resource, a contribution score indicative of a level of contribution towards the score for the compute resource is determined. For example, with reference to FIG. 9, contribution determiner 902 determines a level of contribution (e.g., contribution score 904) for such features.

At step 1104, user input that selects the at least one of the node or the edge coupling the at least one node to the other node is detected. For example, with reference to FIGS. 9 and 10, graph monitor 914 detects user input that selects node 508.

At step 1106, responsive to detecting the user input, a listing of at least one feature of the features is provided for the associated compute resource having a contribution score that exceeds a predetermined threshold. For example, with reference to FIG. 9, graph monitor 914 provides a listing of at least one feature of the features for the associated compute resource (the resource associated with the selected node or edge). The at least one feature has a contribution score that exceeds a predetermined threshold. For example, with reference to FIG. 10, graph monitor 914 provides the features depicted in right window pane 1002 responsive to a user selecting node 508. Such features were determined to exceed the predetermined threshold.

III. Example Mobile and Stationary Device Embodiments

The systems and methods described above, including for providing focus to problematic compute resources represented via a dependency graph in reference to FIGS. 1-11, monitoring tool 100, dependency graph generator 102, graph analyzer 104, graph monitor 108, dependency graph 106, compute resources 210, monitor 204, dependency graph generator 202, data retriever 214, graph builder 216, dependency graph 206, dependency graph 300, graph analyzer 404, feature extractor 408, classification model 412, score ranker 410, dependency graph generator 402, data retriever 414, graph builder 416, graph focuser 418, dependency graphs 406 and 406', dependency graph 500, graph monitor 708, supervised machine learning algorithm 702, classification model 712, feature extractor 908, contribution determiner 902, graph monitor 914, classification model, dependency graph 906', and GUI 100, and/or each of the components described therein, and/or flowcharts 600, 800, and/or 1100 may be each implemented as computer program code/instructions configured to be executed in one or more processors and stored in a computer readable storage medium. Alternatively, monitoring tool 100, dependency graph generator 102, graph analyzer 104, graph monitor 108, dependency graph 106, compute resources 210, monitor 204, dependency graph generator 202, data retriever 214, graph builder 216, dependency graph 206, dependency graph 300, graph analyzer 404, feature extractor 408, classification model 412, score ranker 410, dependency graph generator 402, data retriever 414, graph builder 416, graph focuser 418, dependency graphs 406 and 406', dependency graph 500, graph monitor 708, supervised machine learning algorithm 702, classification model 712, feature extractor 908, contribution determiner 902, graph monitor 914, classification model, dependency graph 906', and GUI 100, and/or each of the components described therein, and/or flowcharts 600, 800, and/or 1100 may be implemented in hardware, or hardware combined with one or both of software and/or firmware. For example, monitoring tool 100, dependency graph generator 102, graph analyzer 104, graph monitor 108, dependency graph 106, compute resources 210, monitor 204, dependency graph generator 202, data retriever 214, graph builder 216, dependency graph 206, dependency graph 300, graph analyzer 404, feature extractor 408, classification model 412, score ranker 410, dependency graph generator 402, data retriever 414, graph builder 416, graph focuser 418, dependency graphs 406 and 406', dependency graph 500, graph monitor 708, supervised machine learning algorithm 702, classification model 712, feature extractor 908, contribution determiner 902, graph monitor 914, classification model, dependency graph 906', and GUI 100, and/or each of the components described therein, and/or flowcharts 600, 800, and/or 1100 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 12:
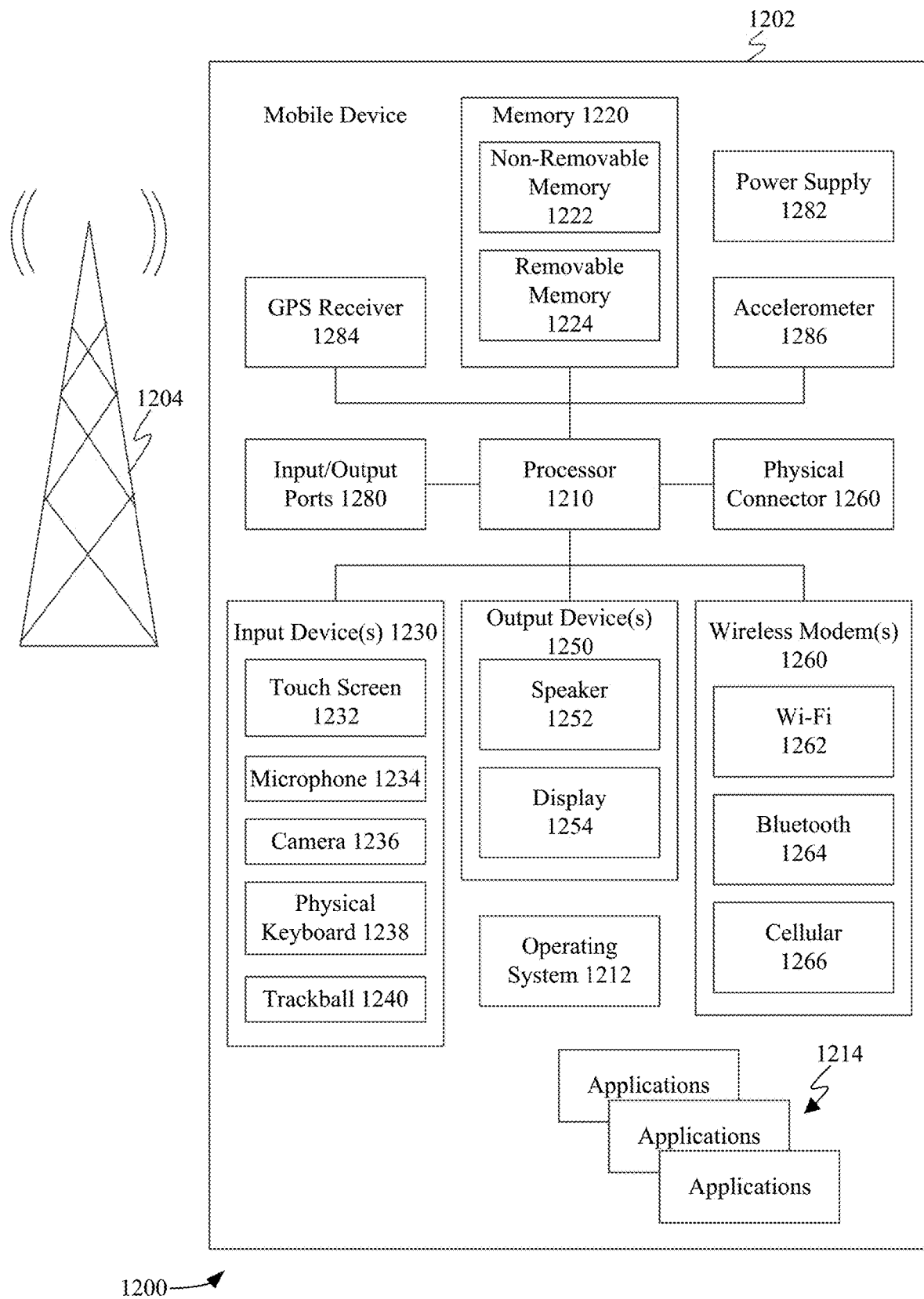
FIG. 12 is a block diagram of an exemplary user device in which embodiments may be implemented.

FIG. 12 shows a block diagram of an exemplary mobile device 1200 including a variety of optional hardware and software components, shown generally as components 1202. Any number and combination of the features/elements of the systems and methods described above may be implemented as components 1202 included in a mobile device embodiment, as well as additional and/or alternative features/elements, as would be known to persons skilled in the relevant art(s). It is noted that any of components 1202 can communicate with any other of components 1202, although not all connections are shown, for ease of illustration. Mobile device 1200 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1204, such as a cellular or satellite network, or with a local area or wide area network.

The illustrated mobile device 1200 can include a controller or processor referred to as processor circuit 1210 for performing such tasks as signal coding, image processing, data processing, input/output processing, power control, and/or other functions. Processor circuit 1210 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1210 may execute program code stored in a computer readable medium, such as program code of one or more applications 1214, operating system 1212, any program code stored in memory 1220, etc. Operating system 1212 can control the allocation and usage of the components 1202 and support for one or more application programs 1214 (a.k.a. applications, "apps", etc.). Application programs 1214 can include common mobile computing applications (e.g., email applications, calendars, contact managers, web browsers, messaging applications) and any other computing applications (e.g., word processing applications, mapping applications, media player applications).

As illustrated, mobile device 1200 can include memory 1220. Memory 1220 can include non-removable memory 1222 and/or removable memory 1224. The non-removable memory 1222 can include RAM, ROM, flash memory, a hard disk, or other well-known memory storage technologies. The removable memory 1224 can include flash memory or a Subscriber Identity Module (SIM) card, which is well known in GSM communication systems, or other well-known memory storage technologies, such as "smart cards." The memory 1220 can be used for storing data and/or code for running operating system 1212 and applications 1214. Example data can include web pages, text, images, sound files, video data, or other data sets to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1220. These programs include operating system 1212, one or more application programs 1214, and other program modules and program data. Examples of such application programs or program modules may include, for example, computer program logic (e.g., computer program code or instructions) for implementing the systems and methods described above, including the embodiments described in reference to FIGS. 1-11, monitoring tool 100, dependency graph generator 102, graph analyzer 104, graph monitor 108, dependency graph 106, compute resources 210, monitor 204, dependency graph generator 202, data retriever 214, graph builder 216, dependency graph 206, dependency graph 300, graph analyzer 404, feature extractor 408, classification model 412, score ranker 410, dependency graph generator 402, data retriever 414, graph builder 416, graph focuser 418, dependency graphs 406 and 406', dependency graph 500, graph monitor 708, supervised machine learning algorithm 702, classification model 712, feature extractor 908, contribution determiner 902, graph monitor 914, classification model, dependency graph 906', and GUI 100, and/or each of the components described therein, and/or flowcharts 600, 800, and/or 1100 may be implemented in hardware, or hardware combined with one or both of software and/or firmware. For example, monitoring tool 100, dependency graph generator 102, graph analyzer 104, graph monitor 108, dependency graph 106, compute resources 210, monitor 204, dependency graph generator 202, data retriever 214, graph builder 216, dependency graph 206, dependency graph 300, graph analyzer 404, feature extractor 408, classification model 412, score ranker 410, dependency graph generator 402, data retriever 414, graph builder 416, graph focuser 418, dependency graphs 406 and 406', dependency graph 500, graph monitor 708, supervised machine learning algorithm 702, classification model 712, feature extractor 908, contribution determiner 902, graph monitor 914, classification model, dependency graph 906', and GUI 100, and/or each of the components described therein, and/or flowcharts 600, 800, and/or 1100.

Mobile device 1200 can support one or more input devices 1230, such as a touch screen 1232, microphone 1234, camera 1236, physical keyboard 1238 and/or trackball 1240 and one or more output devices 1250, such as a speaker 1252 and a display 1254.

Other possible output devices (not shown) can include piezoelectric or other haptic output devices. Some devices can serve more than one input/output function. For example, touch screen 1232 and display 1254 can be combined in a single input/output device. The input devices 1230 can include a Natural User Interface (NUI).

Wireless modem(s) 1260 can be coupled to antenna(s) (not shown) and can support two-way communications between processor circuit 1210 and external devices, as is well understood in the art. The modem(s) 1260 are shown generically and can include a cellular modem 1266 for communicating with the mobile communication network 1204 and/or other radio-based modems (e.g., Bluetooth 1264 and/or Wi-Fi 1262). Cellular modem 1266 may be configured to enable phone calls (and optionally transmit data) according to any suitable communication standard or technology, such as GSM, 3G, 4G, 5G, etc. At least one of the wireless modem(s) 1260 is typically configured for communication with one or more cellular networks, such as a GSM network for data and voice communications within a single cellular network, between cellular networks, or between the mobile device and a public switched telephone network (PSTN).

Mobile device 1200 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components 1202 are not required or all-inclusive, as any components can be not present and other components can be additionally present as would be recognized by one skilled in the art.

Figure 13:
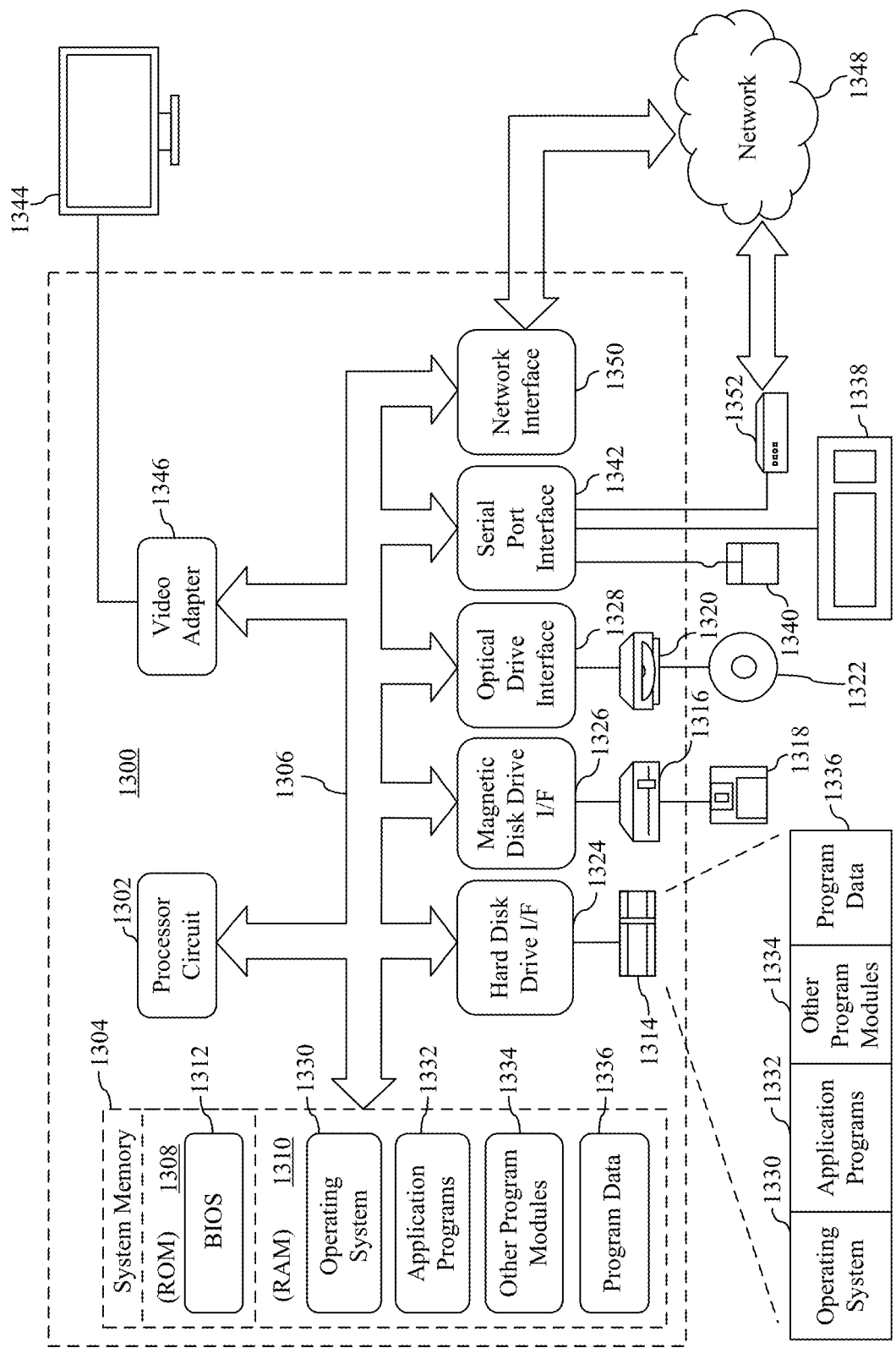
FIG. 13 is a block diagram of an example processor-based computer system that may be used to implement various embodiments.

Furthermore, FIG. 13 depicts an exemplary implementation of a computing device 1300 in which embodiments may be implemented, including monitoring tool 100, dependency graph generator 102, graph analyzer 104, graph monitor 108, dependency graph 106, compute resources 210, monitor 204, dependency graph generator 202, data retriever 214, graph builder 216, dependency graph 206, dependency graph 300, graph analyzer 404, feature extractor 408, classification model 412, score ranker 410, dependency graph generator 402, data retriever 414, graph builder 416, graph focuser 418, dependency graphs 406 and 406', dependency graph 500, graph monitor 708, supervised machine learning algorithm 702, classification model 712, feature extractor 908, contribution determiner 902, graph monitor 914, classification model, dependency graph 906', and GUI 100, and/or each of the components described therein, and/or flowcharts 600, 800, and/or 1100 may be implemented in hardware, or hardware combined with one or both of software and/or firmware. For example, monitoring tool 100, dependency graph generator 102, graph analyzer 104, graph monitor 108, dependency graph 106, compute resources 210, monitor 204, dependency graph generator 202, data retriever 214, graph builder 216, dependency graph 206, dependency graph 300, graph analyzer 404, feature extractor 408, classification model 412, score ranker 410, dependency graph generator 402, data retriever 414, graph builder 416, graph focuser 418, dependency graphs 406 and 406', dependency graph 500, graph monitor 708, supervised machine learning algorithm 702, classification model 712, feature extractor 908, contribution determiner 902, graph monitor 914, classification model, dependency graph 906', and GUI 100, and/or each of the components described therein, and/or flowcharts 600, 800, and/or 1100. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing the systems and methods described above, including the embodiments described above with reference to FIGS. 1-11.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to generally refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including system memory 1304 of FIG. 13). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1352, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method for identifying a problematic compute resource via a dependency graph that comprises a plurality of nodes representing a plurality of compute resources. The method comprises: for each compute resource represented by a node of the dependency graph: providing features associated with the compute resource to a machine learning model configured to output a score for the compute resource, the score indicating a likelihood that the compute resource is problematic; and for each node associated with a score that exceeds a predetermined threshold: providing focus to at least one of the node or an edge coupling the at least one node to another node of the dependency graph that represents another compute resource.

In an embodiment of the foregoing method, providing focus to the at least one of the node or the edge coupling the node to another node of the dependency graph comprises: causing the at least one of the node or the edge coupling the node to another node to be highlighted.

In an embodiment of the foregoing method, the plurality of compute resources comprises at least one of: a microservice; a service; or a virtual machine.

In an embodiment of the foregoing method, the features associated with the compute resource comprise at least one of: a number of first requests issued by the compute resource; a detected anomaly in the number of first requests issued by the compute resources; a number of the first requests that failed; a detected anomaly in the number of first requests that failed; a type of the first requests that failed; a duration for each of the first requests; a detected anomaly in the duration for each of the first requests; a number of second requests received by the compute resource; a detected anomaly in the number of second requests received by the compute resource; a number of the second requests that failed; a detected anomaly in the number of the second requests that failed; a type of the second requests that failed; a duration for each of the second requests; a detected anomaly in the duration for each of the second requests; a ratio of the number of first requests with respect to at least one of other requests issued by the compute resource or requests issued by other compute resources; a ratio of the number second requests with respect to at least one of other requests received by the compute resource or requests received by other compute resources; a ratio of the number of first requests that failed with respect to at least one of other requests issued by the compute resource that failed or other requests issued by other compute resources that failed; a ratio of the number of second requests that failed with respect to at least one of other requests received by the compute resource that failed or other requests received by other compute resources that failed; an average number of geographical regions in which other compute resources that made requests to the compute resource are located; an average number of geographical regions in which other compute resources that made failed requests to the compute resource are located; a detected anomaly in the average number of geographical regions in which other compute resource that made requests to the compute resources are located; or a detected anomaly in the average number of geographical regions in which other compute resources that made failed requests to the compute resource are located.

In an embodiment of the foregoing method, the machine learning model is generated by: determining at least one user from which first training data is to be collected; providing first features associated with first previously-executed compute resources as first training data to a machine learning algorithm, the first previously-executed compute resources being interacted with by the determined at least one user during at least one debug session, the first training data being positively-labeled as representing problematic features; and providing second features associated with second previously-executed compute resources as second training data to the machine learning algorithm, the second previously-executed compute resources not being interacted with by the determined at least one user during the at least one debug session, the second training data being negatively-labeled as representing non-problematic features, wherein the machine learning algorithm generates the machine learning model based on the first training data and the second training data.

In an embodiment of the foregoing method, determining the at least one user comprises: for each user of a plurality of users: determining that a number of debug sessions in which the user has engaged exceeds a predetermined threshold; and in response to determining that the number of debug sessions in which the at least one user has engaged has exceeded the predetermined threshold, determining that the first training data is to be collected from the user.

In an embodiment of the foregoing method, for each feature of the features: determining a contribution score indicative of a level of contribution towards the score for the compute resource; detecting user input that selects the at least one of the node or the edge coupling the at least one node to the other node; and responsive to detecting the user input, providing a listing of at least one feature of the features for the associated compute resource having a contribution score that exceeds a predetermined threshold.

A system for identifying a problematic compute resource via a dependency graph that comprises a plurality of nodes representing a plurality of compute resources is also described herein. The system comprises: at least one processor circuit; and at least one memory that stores program code configured to be executed by the at least one processor circuit. The program code comprises: a graph analyzer configured to, for each compute resource represented by a node of the dependency graph, provide features associated with the compute resource to a machine learning model configured to output a score for the compute resource, the score indicating a likelihood that the compute resource is problematic; and a dependency graph generator configured to, for each node associated with a score that exceeds a predetermined threshold, provide focus to at least one of the node or an edge coupling the at least one node to another node of the dependency graph that represents another compute resource.

In an embodiment of the foregoing system, the dependency graph generator comprises a graph focuser configured to: cause the at least one of the node or the edge coupling the node to another node to be highlighted.

In an embodiment of the foregoing system, the plurality of compute resources comprises at least one of: a microservice; a service; or a virtual machine.

In an embodiment of the foregoing system, the features associated with the compute resource comprise at least one of: a number of first requests issued by the compute resource; a detected anomaly in the number of first requests issued by the compute resources; a number of the first requests that failed; a detected anomaly in the number of first requests that failed; a type of the first requests that failed; a duration for each of the first requests; a detected anomaly in the duration for each of the first requests; a number of second requests received by the compute resource; a detected anomaly in the number of second requests received by the compute resource; a number of the second requests that failed; a detected anomaly in the number of the second requests that failed; a type of the second requests that failed; a duration for each of the second requests; a detected anomaly in the duration for each of the second requests; a ratio of the number of first requests with respect to at least one of other requests issued by the compute resource or requests issued by other compute resources; a ratio of the number second requests with respect to at least one of other requests received by the compute resource or requests received by other compute resources; a ratio of the number of first requests that failed with respect to at least one of other requests issued by the compute resource that failed or other requests issued by other compute resources that failed; a ratio of the number of second requests that failed with respect to at least one of other requests received by the compute resource that failed or other requests received by other compute resources that failed; an average number of geographical regions in which other compute resources that made requests to the compute resource are located; an average number of geographical regions in which other compute resources that made failed requests to the compute resource are located; a detected anomaly in the average number of geographical regions in which other compute resource that made requests to the compute resources are located; or a detected anomaly in the average number of geographical regions in which other compute resources that made failed requests to the compute resource are located.

In an embodiment of the foregoing system, the program code further comprises a graph monitor configured to: determine at least one user from which first training data is to be collected; provide first features associated with first previously-executed compute resources as first training data to a machine learning algorithm, the first previously-executed compute resources being interacted with by the determined at least one user during at least one debug session, the first training data being positively-labeled as representing problematic features; and provide second features associated with second previously-executed compute resources as second training data to the machine learning algorithm, the second previously-executed compute resources not being interacted with by the determined at least one user during the at least one debug session, the second training data being negatively-labeled as representing non-problematic features, wherein the machine learning algorithm generates the machine learning model based on the first training data and the second training data.

In an embodiment of the foregoing system, the graph monitor is further configured to: for each user of a plurality of users: determine that a number of debug sessions in which the user has engaged exceeds a predetermined threshold; and in response to determining that the number of debug sessions in which the at least one user has engaged has exceeded the predetermined threshold, determine that the first training data is to be collected from the user.

In an embodiment of the foregoing system, the program code further comprises a contribution determiner configured to: for each feature of the features: determine a contribution score indicative of a level of contribution towards the score for the compute resource; wherein the graph monitor is further configured to: detect user input that selects the at least one of the node or the edge coupling the at least one node to the other node; and responsive to detecting the user input, provide a listing of at least one feature of the features for the associated compute resource having a contribution score that exceeds a predetermined threshold.

A computer-readable storage medium having program instructions recorded thereon that, when executed by at least one processor of a computing device perform a method for identifying a problematic compute resource via a dependency graph that comprises a plurality of nodes representing a plurality of compute resources is further described herein. The method comprises: for each compute resource represented by a node of the dependency graph: providing features associated with the compute resource to a machine learning model configured to output a score for the compute resource, the score indicating a likelihood that the compute resource is problematic; and for each node associated with a score that exceeds a predetermined threshold: providing focus to at least one of the node or an edge coupling the at least one node to another node of the dependency graph that represents another compute resource.

In an embodiment of the computer-readable storage medium, providing focus to the at least one of the node or the edge coupling the node to another node of the dependency graph comprises: causing the at least one of the node or the edge coupling the node to another node to be highlighted.

In an embodiment of the computer-readable storage medium, the plurality of compute resources comprises at least one of: a microservice; a service; or a virtual machine.

In an embodiment of the computer-readable storage medium, the features associated with the compute resource comprise at least one of: a number of first requests issued by the compute resource; a detected anomaly in the number of first requests issued by the compute resources; a number of the first requests that failed; a detected anomaly in the number of first requests that failed; a type of the first requests that failed; a duration for each of the first requests; a detected anomaly in the duration for each of the first requests; a number of second requests received by the compute resource; a detected anomaly in the number of second requests received by the compute resource; a number of the second requests that failed; a detected anomaly in the number of the second requests that failed; a type of the second requests that failed; a duration for each of the second requests; a detected anomaly in the duration for each of the second requests; a ratio of the number of first requests with respect to at least one of other requests issued by the compute resource or requests issued by other compute resources; a ratio of the number second requests with respect to at least one of other requests received by the compute resource or requests received by other compute resources; a ratio of the number of first requests that failed with respect to at least one of other requests issued by the compute resource that failed or other requests issued by other compute resources that failed; a ratio of the number of second requests that failed with respect to at least one of other requests received by the compute resource that failed or other requests received by other compute resources that failed; an average number of geographical regions in which other compute resources that made requests to the compute resource are located; an average number of geographical regions in which other compute resources that made failed requests to the compute resource are located; a detected anomaly in the average number of geographical regions in which other compute resource that made requests to the compute resources are located; or a detected anomaly in the average number of geographical regions in which other compute resources that made failed requests to the compute resource are located.

In an embodiment of the computer-readable storage medium, the machine learning model is generated by: determining at least one user from which first training data is to be collected; providing first features associated with first previously-executed compute resources as first training data to a machine learning algorithm, the first previously-executed compute resources being interacted with by the determined at least one user during at least one debug session, the first training data being positively-labeled as representing problematic features; and providing second features associated with second previously-executed compute resources as second training data to the machine learning algorithm, the second previously-executed compute resources not being interacted with by the determined at least one user during the at least one debug session, the second training data being negatively-labeled as representing non-problematic features, wherein the machine learning algorithm generates the machine learning model based on the first training data and the second training data.

In an embodiment of the computer-readable storage medium, determining the at least one user comprises: for each user of a plurality of users: determining that a number of debug sessions in which the user has engaged exceeds a predetermined threshold; and in response to determining that the number of debug sessions in which the at least one user has engaged has exceeded the predetermined threshold, determining that the first training data is to be collected from the user.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method for identifying a problematic compute resource, comprising:
   providing first features associated with first previously-executed compute resources as first training data to a machine learning model, at least one user having interacted with the first previously-executed compute resources during at least one debug session, the first training data being positively-labeled as representing problematic features;
   providing second features associated with second previously-executed compute resources as second training data to the machine learning model, the at least one user having not interacted with the second previously-executed compute resources during the at least one debug session, the second training data being negatively-labeled as representing non-problematic features;
   determining, based on the machine learning model, a score indicating a likelihood that a compute resource of a plurality of compute resources is problematic;
   generating a dependency graph that comprises a plurality of nodes representing the plurality of compute resources;
   identifying the compute resource represented by a particular node as being problematic based on the score for the compute resource being above a predetermined score threshold; and
   providing the dependency graph for display, wherein the dependency graph provided for display emphasizes the compute resource represented by the particular node as being problematic by graphically distinguishing at least one of the particular node or an edge connecting the particular node to a connected node from at least one of other nodes or other edges.

2. The method of claim 1, wherein graphically distinguishing the at least one of the particular node or the edge comprises highlighting the at least one of the particular node or the edge.

3. The method of claim 1, wherein the plurality of compute resources comprises at least one of:
   a microservice;
   a service; or
   a virtual machine.

4. The method of claim 1, wherein at least one of the first features or the second features includes:
   a number of first requests issued by at least one compute resource;
   a detected anomaly in the number of the first requests issued by the at least one compute resource;
   a number of the first requests issued by the at least one compute resource that failed;
   a detected anomaly in the number of the first requests issued by the at least one compute resource that failed;
   a type of the first requests issued by the at least one compute resource that failed;
   a duration for each of the first requests issued by the at least one compute resource;
   a detected anomaly in the duration for each of the first requests issued by the at least one compute resource;
   a number of second requests received by the at least one compute resource;
   a detected anomaly in the number of the second requests received by the at least one compute resource;
   a number of the second requests received by the at least one compute resource that failed;
   a detected anomaly in the number of the second requests received by the at least one compute resource that failed;
   a type of the second requests received by the at least one compute resource that failed;
   a duration for each of the second requests received by the at least one compute resource;
   a detected anomaly in the duration for each of the second requests received by the at least one compute resource;
   a ratio of the number of the first requests issued by the at least one compute resource with respect to at least one of other requests issued by the at least one compute resource or requests issued by other compute resources of the plurality of compute resources;
   a ratio of the number of the second requests received by the at least one compute resource with respect to at least one of other requests received by the at least one compute resource or requests received by other compute resources of the plurality of compute resources;
   a ratio of the number of the first requests issued by the at least one compute resource that failed with respect to at least one of other requests issued by the at least one compute resource that failed or other requests issued by other compute resources of the plurality of compute resources that failed;
   a ratio of the number of the second requests received by the at least one compute resource that failed with respect to at least one of other requests received by the at least one compute resource that failed or other requests received by other compute resources of the plurality of compute resources that failed;
   an average number of geographical regions in which other compute resources of the plurality of compute resources that made requests to the at least one compute resource are located;
   an average number of geographical regions in which other compute resources of the plurality of compute resources that made failed requests to the at least one compute resource are located;
   a detected anomaly in the average number of geographical regions in which other compute resource of the plurality of compute resources that made requests to the at least one compute resource are located; or a detected anomaly in the average number of geographical regions in which other compute resources of the plurality of compute resources that made failed requests to the at least one compute resource are located.

5. The method of claim 1, wherein the at least one user has engaged in a number of debug sessions that exceeds a predetermined threshold.

6. The method of claim 1, further comprising:
detecting user input that selects the at least one of the particular node or the edge; and
responsive to detecting the user input, providing a listing of features for the compute resource represented by the particular node, a feature in the listing of features having a contribution score that exceeds a predetermined threshold, the contribution score being indicative of a level of contribution towards the score for the compute resource.

7. The method of claim 1, further comprising providing a feature associated with the compute resource represented by the particular node for display in association with the dependency graph, wherein the identifying the compute resource represented by the particular node as being problematic is based on the feature.

8. A system for identifying a problematic compute resource, comprising:
at least one processor circuit; and
at least one memory that stores program code that, upon execution by the at least one processor circuit, causes the at least one processor circuit to perform operations comprising:
generating a dependency graph that comprises a plurality of nodes representing a plurality of compute resources, each node of the plurality of nodes being assigned a score indicating a likelihood that a compute resource represented by the node is problematic by a machine learning model;
identifying a particular compute resource represented by a particular node as being problematic based on the score for the particular node being above a predetermined score threshold;
providing the dependency graph for display, wherein the dependency graph provided for display emphasizes the particular compute resource represented by the particular node as being problematic by graphically distinguishing at least one of the particular node or an edge connecting the particular node to a connected node from at least one of other nodes or other edges;
detecting user input that selects the at least one of the particular node or the edge; and
responsive to detecting the user input, providing a listing of features for the particular compute resource represented by the particular node, a feature in the listing of features having a contribution score that exceeds a predetermined threshold, the contribution score being indicative of a level of contribution towards the score for the particular node.

9. The system of claim 8, wherein graphically distinguishing the at least one of the particular node or the edge comprises highlighting the at least one of the particular node or the edge.

10. The system of claim 8, wherein the plurality of compute resources comprises at least one of:
a microservice;
a service; or
a virtual machine.

11. The system of claim 8, wherein the machine learning model uses at least one feature associated with at least one compute resource of the plurality of compute resources, the at least one feature including:
a number of first requests issued by the at least one compute resource;
a detected anomaly in the number of the first requests issued by the at least one compute resource;
a number of the first requests issued by the at least one compute resource that failed;
a detected anomaly in the number of the first requests issued by the at least one compute resource that failed;
a type of the first requests issued by the at least one compute resource that failed;
a duration for each of the first requests issued by the at least one compute resource;
a detected anomaly in the duration for each of the first requests issued by the at least one compute resource;
a number of second requests received by the at least one compute resource;
a detected anomaly in the number of the second requests received by the at least one compute resource;
a number of the second requests received by the at least one compute resource that failed;
a detected anomaly in the number of the second requests received by the at least one compute resource that failed;
a type of the second requests received by the at least one compute resource that failed;
a duration for each of the second requests received by the at least one compute resource;
a detected anomaly in the duration for each of the second requests received by the at least one compute resource;
a ratio of the number of the first requests issued by the at least one compute resource with respect to at least one of other requests issued by the at least one compute resource or requests issued by other compute resources of the plurality of compute resources;
a ratio of the number of the second requests received by the at least one compute resource with respect to at least one of other requests received by the at least one compute resource or requests received by other compute resources of the plurality of compute resources;
a ratio of the number of the first requests issued by the at least one compute resource that failed with respect to at least one of other requests issued by the at least one compute resource that failed or other requests issued by other compute resources of the plurality of compute resources that failed;
a ratio of the number of second requests received by the at least one compute resource that failed with respect to at least one of other requests received by the at least one compute resource that failed or other requests received by other compute resources of the plurality of compute resources that failed;
an average number of geographical regions in which other compute resources of the plurality of compute resources that made requests to the at least one compute resource are located;
an average number of geographical regions in which other compute resources of the plurality of compute resources that made failed requests to the at least one compute resource are located;
a detected anomaly in the average number of geographical regions in which other compute resource of the plurality of compute resources that made requests to the at least one compute resource are located; or a detected anomaly in the average number of geographical regions in which other compute resources of the plurality of compute resources that made failed requests to the at least one compute resource are located.

12. The system of claim 8, wherein the operations further comprise:
providing first features associated with first previously-executed compute resources as first training data to a machine learning algorithm, at least one user having interacted with the first previously-executed compute resources during at least one debug session, the first training data being positively-labeled as representing problematic features; and
providing second features associated with second previously-executed compute resources as second training data to the machine learning algorithm, the at least one user having not interacted with the second previously-executed compute resources during the at least one debug session, the second training data being negatively-labeled as representing non-problematic features, wherein the machine learning algorithm generates the machine learning model based on the first training data and the second training data.

13. The system of claim 12, wherein the at least one user has engaged in a number of debug sessions that exceeds a predetermined threshold.

14. A computer-readable storage medium having program instructions recorded thereon that, when executed by at least one processor of a computing device perform operations comprising:
generating a dependency graph that comprises a plurality of nodes representing a plurality of compute resources, each node of the plurality of nodes being assigned a score indicating a likelihood that a compute resource represented by the node is problematic by a machine learning model;
identifying a particular compute resource represented by a particular node as being problematic based on the score for the particular node being above a predetermined score threshold;
providing the dependency graph for display, wherein the dependency graph provided for display emphasizes the particular compute resource represented by the particular node as being problematic by graphically distinguishing at least one of the particular node or an edge connecting the particular node to a connected node from at least one of other nodes or other edges;
detecting user input that selects the at least one of the particular node or the edge; and
responsive to detecting the user input, providing a listing of features for the particular compute resource represented by the particular node, a feature in the listing of features having a contribution score that exceeds a predetermined threshold, the contribution score being indicative of a level of contribution towards the score for the particular node.

15. The computer-readable storage medium of claim 14, wherein graphically distinguishing the at least one of the particular node or the edge comprises highlighting the at least one of the particular node or the edge.

16. The computer-readable storage medium of claim 14, wherein the machine learning model uses at least one feature associated with at least one compute resource of the plurality of compute resources, the at least one feature including:
a number of first requests issued by the at least one compute resource;
a detected anomaly in the number of the first requests issued by the at least one compute resource;
a number of the first requests issued by the at least one compute resource that failed;
a detected anomaly in the number of the first requests issued by the at least one compute resource that failed;
a type of the first requests issued by the at least one compute resource that failed;
a duration for each of the first requests issued by the at least one compute resource;
a detected anomaly in the duration for each of the first requests issued by the at least one compute resource;
a number of second requests received by the at least one compute resource;
a detected anomaly in the number of the second requests received by the at least one compute resource;
a number of the second requests received by the at least one compute resource that failed;
a detected anomaly in the number of the second requests received by the at least one compute resource that failed;
a type of the second requests received by the at least one compute resource that failed;
a duration for each of the second requests received by the at least one compute resource;
a detected anomaly in the duration for each of the second requests received by the at least one compute resource;
a ratio of the number of the first requests issued by the at least one compute resource with respect to at least one of other requests issued by the at least one compute resource or requests issued by other compute resources of the plurality of compute resources;
a ratio of the number of the second requests received by the at least one compute resource with respect to at least one of other requests received by the at least one compute resource or requests received by other compute resources of the plurality of compute resources;
a ratio of the number of the first requests issued by the at least one compute resource that failed with respect to at least one of other requests issued by the at least one compute resource that failed or other requests issued by other compute resources of the plurality of compute resources that failed;
a ratio of the number of the second requests received by the at least one compute resource that failed with respect to at least one of other requests received by the at least one compute resource that failed or other requests received by other compute resources of the plurality of compute resources that failed;
an average number of geographical regions in which other compute resources of the plurality of compute resources that made requests to the at least one compute resource are located;
an average number of geographical regions in which other compute resources of the plurality of compute resources that made failed requests to the at least one compute resource are located;
a detected anomaly in the average number of geographical regions in which other compute resource of the plurality of compute resources that made requests to the at least one compute resource are located; or
a detected anomaly in the average number of geographical regions in which other compute resources of the plurality of compute resources that made failed requests to the at least one compute resource are located.

17. The computer-readable storage medium of claim 6, wherein the machine learning model is generated by:

providing first features associated with first previously-executed compute resources as first training data to a machine learning algorithm, at least one user having interacted with the first previously-executed compute resources during at least one debug session, the first training data being positively-labeled as representing problematic features; and providing second features associated with second previously-executed compute resources as second training data to the machine learning algorithm, the at least one user having not interacted with the second previously-executed compute resources during the at least one debug session, the second training data being negatively-labeled as representing non-problematic features, wherein the machine learning algorithm generates the machine learning model based on the first training data and the second training data.

18. The computer-readable storage medium of claim 17, wherein the at least one user has engaged in a number of debug sessions that exceeds a predetermined threshold.

* * * * *